United States Patent
He et al.

(10) Patent No.: US 10,211,951 B2
(45) Date of Patent: Feb. 19, 2019

(54) DECODING METHOD AND APPARATUS

(71) Applicant: Huawei Technologies Co., Ltd., Shenzhen, Guangdong (CN)

(72) Inventors: Gaoning He, Boulogne Billancourt (FR); Shunqing Zhang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 15/394,404

(22) Filed: Dec. 29, 2016

(65) Prior Publication Data

US 2017/0111142 A1    Apr. 20, 2017

Related U.S. Application Data

(63) Continuation of application No. PCT/CN2014/081321, filed on Jun. 30, 2014.

(51) Int. Cl.
*H04L 1/00* (2006.01)
*H04L 25/03* (2006.01)

(52) U.S. Cl.
CPC .......... *H04L 1/0052* (2013.01); *H04L 1/0054* (2013.01); *H04L 25/03* (2013.01)

(58) Field of Classification Search
CPC ..... H04L 1/0052; H04L 1/0054; H04L 25/03; H04L 25/03171
See application file for complete search history.

(56) References Cited

U.S. PATENT DOCUMENTS

2014/0140360 A1    5/2014  Nikopour et al.
2014/0169408 A1*   6/2014  Bayesteh ............ H04B 7/0473
                                                              375/144

FOREIGN PATENT DOCUMENTS

| CN | 101651522 A | 2/2010 |
| CN | 102468911 A | 5/2012 |
| CN | 103369658 A | 10/2013 |
| CN | 103841065 A | 6/2014 |

OTHER PUBLICATIONS

Nikopour et al., "Sparse Code Multiple Access," 2013 IEEE 24th Annual International Symposium on Personal, Indoor, and Mobile Radio Communications (PIMRC), London, Sep. 8-11, 2013, pp. 332-336.*

(Continued)

*Primary Examiner* — Michelle M Koeth

(57) ABSTRACT

Embodiments of the present invention provide a decoding method and apparatus. The method includes: receiving K user signals by using N subcarriers, where one user signal is carried on at least two subcarriers of the N subcarriers, one subcarrier carries at least two user signals of the K user signals, and $2 \leq N < K$; determining, from the N subcarriers, at least two target subcarriers that carry a target user signal, and performing initialization calculation on the target subcarriers, to obtain initialization calculation results; and determining, in a logarithm domain, a probability of each codeword in a codebook of the target user signal according to the initialization calculation results, to decode the target user signal. According to this method, decoding can be performed in the logarithm domain with low complexity.

20 Claims, 8 Drawing Sheets

(56) References Cited

OTHER PUBLICATIONS

Hoshyar et al., "Novel Low-Density Signature for Synchronous CDMA Systems Over AWGN Channel," in IEEE Transactions on Signal Processing, vol. 56, No. 4, pp. 1616-1626, Apr. 2008.*
Wen Che, et al., "Performance of Low Density Parity Check Code Applied in WiBro System," IEEE 2007 International Symposium on Microwave Antenna, Propagation, and EMC Technologies for Wireless Communications, IEEE, PI, Aug. 1, 2007, pp. 239-242, XP031167679.
Hosein Nikopour, et al., "Sparse Code Multiple Access," 2013 IEEE 24th International Symposium on Personal, Indoor and Mobile Radio Communications: Fundamentals and PHY Track, Sep. 8, 2013, pp. 332-336, XP055227113.
Patrick Robertson, "A Comparison of Optimal and Sub-Optimal MAP Decoding Algorithms Operating in the Log Domain," Communications—Gateway to Globalization, Proceedings of the International Conference on Communications, Seattle, Jun. 18-22, 1995; [Proceedings of the International Conference on Communications (ICC)], New York, IEEE, US, vol. 2, Jun. 18, 1995, pp. 1009-1013, XP000533149.

\* cited by examiner

… … …

DECODING METHOD AND APPARATUS

CROSS-REFERENCE TO RELATED APPLICATIONS

This application is a continuation of International Patent Application No. PCT/CN2014/081321, filed on Jun. 30, 2014, the disclosure of which is hereby incorporated by reference in its entirety.

TECHNICAL FIELD

Embodiments of the present invention relate to the field of communications technologies, and more specifically, to a decoding method and apparatus.

BACKGROUND

In an LTE system, multiple users share a system resource in an "orthogonal" manner. "Orthogonal" herein means that one system resource block (for example, an RE) can be allocated at most to only one user (or virtual user) for use. Therefore, a manner in which different users occupy a frequency resource is "orthogonal". This orthogonal resource allocation manner has its practical aspect, but is far from being optimal in terms of spectral efficiency and a channel capacity. Recently, a "non-orthogonal"-type air interface access manner gradually becomes a hot topic among international scholars, and is likely to become one of focused topics of a next-generation cellular communications technology (for example, 5G, fifth generation communications technology). "Non-orthogonal" means that multiple users may share a system resource such as a frequency spectrum in a non-orthogonal manner.

Specifically, according to the existing non-orthogonal air interface access, multiple codewords are allowed to be superposed on one system resource block for transmission. The codewords are superposed in a manner similar to an LDPC (Low Density Parity Check Code, low density parity check code) sparse matrix, and a decoder is used at a receive end to decode information of the multiple codewords to restore original information.

However, a prior-art decoding method is relatively complex and has a relatively high requirement for hardware.

SUMMARY

Embodiments of the present invention provide a decoding method and apparatus, so that decoding can be performed in a logarithm domain with low complexity.

According to a first aspect, a decoding method is provided, where the method includes: receiving K user signals by using N subcarriers, where one user signal is carried on at least two subcarriers of the N subcarriers, one subcarrier carries at least two user signals of the K user signals, and $2 \le N < K$; determining, from the N subcarriers, at least two target subcarriers that carry a target user signal, and performing initialization calculation on the target subcarriers, to obtain initialization calculation results; and determining, in a logarithm domain, a probability of each codeword in a codebook of the target user signal according to the initialization calculation results, to decode the target user signal.

With reference to the first aspect, in a first possible implementation manner, the determining, in a logarithm domain, a probability of each codeword in a codebook of the target user signal according to the initialization calculation results includes: obtaining a first probability according to the target subcarriers, where the first probability includes a probability of each codeword in a codebook of associated user signals, and the associated user signals are all user signals, except the target user signal, of user signals carried on the target subcarriers; determining, in the logarithm domain, a second probability according to the initialization calculation results and the first probability, where the second probability includes a probability that is of each codeword in the codebook of the target user signal and that is corresponding to each of the target subcarriers; and determining the probability of each codeword in the codebook of the target user signal according to the second probability.

With reference to the first possible implementation manner, in a second possible implementation manner, there are two associated user signals, a serial number of a first associated user signal $q_a$ in the K user signals is a, a serial number of a second associated user signal $q_b$ in the K user signals is b, and a serial number of the target user signal $q_k$ in the K user signals is k; and the determining, in the logarithm domain, a second probability according to the initialization calculation results and the first probability includes: determining the second probability according to the following formula:

$$I^{log}_{c_n \to q_k}(i) = \max_{\alpha,\beta}\{f(.) + I^{log}_{q_a \to c_n}(\alpha) + I^{log}_{q_b \to c_n}(\beta)\}, i = 1,$$

$$\ldots |C_k|, \alpha = 1, \ldots |C_a|, \beta = 1, \ldots |C_b|, n \in Z(k),$$

where $I^{log}_{c_n \to q_k}(i)$ represents a probability that is of the $i^{th}$ codeword in the codebook of the target user signal $q_k$ and that is based on a target subcarrier $c_n$ of the at least two target subcarriers; n is a serial number of the target subcarrier $c_n$ in the N subcarriers; Z(k) represents a set of serial numbers of the target subcarriers in the N subcarriers; α represents a serial number of a codeword in a codebook of the first associated user signal; β represents a serial number of a codeword in a codebook of the second associated user signal; i represents a serial number of the codeword in the codebook of the target user signal; f(.) represents an initialization calculation result of the target subcarrier $c_n$; $I^{log}_{q_a \to c_n}(\alpha)$ represents a probability that is of the $\alpha^{th}$ codeword in the codebook of the first associated user signal $q_a$ and that is corresponding to the target subcarrier $c_n$; $I^{log}_{q_b \to c_n}(\beta)$ represents a probability that is of the $\beta^{th}$ codeword in the codebook of the second associated user signal $q_b$ and that is corresponding to the target subcarrier $c_n$; $|C_k|$ represents a quantity of codewords included in the codebook of the target user signal $q_k$; $|C_a|$ represents a quantity of codewords included in the codebook of the first associated user signal $q_a$; and $|C_b|$ represents a quantity of codewords included in the codebook of the second associated user signal $q_b$.

With reference to the first or the second possible implementation manner, in a third possible implementation manner, after the determining the second probability, the method further includes: updating, in the logarithm domain, the first probability according to the target subcarriers; and updating, in the logarithm domain, the second probability according to an updated first probability, where the determining the probability of each codeword in the codebook of the target user signal according to the second probability includes: determining the probability of each codeword in the codebook of the target user signal according to the updated second probability.

With reference to the third possible implementation manner, in a fourth possible implementation manner, the updating, in the logarithm domain, the first probability according to the target subcarriers includes: determining a third associated user signal from at least two associated user signals carried on a first target subcarrier of the at least two target subcarriers; determining an associated subcarrier according to the third associated user signal, where the associated subcarrier is a subcarrier, except the first target subcarrier, of the N subcarriers that carries the third associated user signal; and updating a probability of each codeword in a codebook of the third associated user signal according to the associated subcarrier and based on the following formula:

$$I^{log}_{q_a \to c_n}(\alpha) = \sum_{!n \in W(a)} I^{log}_{c_{!n} \to q_a}(\alpha), \alpha = 1, \ldots |C_a|$$

where $I^{log}_{q_a \to c_n}(\alpha)$ represents a probability that is of the $\alpha^{th}$ codeword in the codebook of the third associated user signal $q_a$ and that is corresponding to the first target subcarrier $c_n$ of the at least two target subcarriers; n represents a serial number of the first target subcarrier in the N subcarriers; a represents a serial number of the third associated user signal $q_a$ in the K user signals; $\alpha$ represents a serial number of a codeword in the codebook of the third associated user signal $q_a$; W(a) represents a set of a serial number of the associated subcarrier in the N subcarriers; !n represents a serial number of an associated subcarrier $c_{!n}$ in the N subcarriers; $I^{log}_{c_{!n} \to q_a}(\alpha)$ represents a probability that is of the $\alpha^{th}$ codeword in the codebook of the third associated user signal $q_a$ and that is obtained through calculation based on the associated subcarrier $c_{!n}$; and $|C_a|$ represents a quantity of codewords included in the codebook of the first associated user signal $q_a$.

With reference to the third or the fourth possible implementation manner, in a fifth possible implementation manner, the serial number of the target user signal $q_k$ in the K user signals is k; and the determining the probability of each codeword in the codebook of the target user signal according to the updated second probability includes: determining the probability $Q_k^{log}(i)$ of each codeword in the codebook of the target user signal $q_k$ according to the following formula:

$$Q_k^{log}(i) = \sum_{n \in Z(k)} I^{log}_{c_n \to q_k}(i), i = 1, \ldots |C_k|$$

where i represents the serial number of the codeword in the codebook of the target user signal; n is a serial number of the target subcarrier $c_n$ of the at least two target subcarriers in the N subcarriers; Z(k) represents the set of the serial numbers of the target subcarriers in the N subcarriers; $I^{log}_{c_n \to q_k}(i)$ represents the probability that is of the $i^{th}$ codeword in the codebook of the target user signal $q_k$ and that is obtained, after updating, through calculation based on the target subcarrier $c_n$; and $|C_k|$ represents the quantity of codewords included in the codebook of the target user signal $q_k$.

With reference to any one of the first aspect or the first to the fifth possible implementation manners, in a sixth possible implementation manner, the method further includes: determining, in the logarithm domain according to the probability of each codeword in the codebook of the target user signal, a log-likelihood ratio LLR corresponding to each codeword in the codebook of the target user signal.

With reference to the sixth possible implementation manner, in a seventh possible implementation manner, the serial number of the target user signal $q_k$ in the K user signals is k; and the determining a log-likelihood ratio LLR corresponding to each codeword in the codebook of the target user signal includes: determining, according to the following formula, an LLR of a bit value of each bit in a modulation symbol corresponding to the $i^{th}$ codeword in the codebook of the target user signal, to determine an LLR corresponding to the codeword in the codebook of the target user signal:

$$LLR_x = \max_{i:u_{i,x}=0}\left(\sum_{n \in Z(k)} I^{log}_{c_n \to q_k}(i)\right) - \max_{i:u_{i,x}=1}\left(\sum_{n \in Z(k)} I^{log}_{c_n \to q_k}(i)\right), x = 1, \ldots, X$$

where $LLR_x$ represents an LLR of a bit value of the $x^{th}$ bit in the modulation symbol corresponding to the $i^{th}$ codeword in the codebook of the target user signal $q_k$; X represents a bit count of a bit value in the modulation symbol corresponding to the $i^{th}$ codeword in the codebook of the target user signal $q_k$; $I^{log}_{c_n \to q_k}(i)$ represents the probability that is of the $i^{th}$ codeword in the codebook of the target user signal $q_k$ and that is obtained through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; and $u_{i,x}$ represents the bit value of the $x^{th}$ bit in the modulation symbol corresponding to the $i^{th}$ codeword in the codebook of the target user signal $q_k$.

With reference to any one of the first aspect or the first to the seventh possible implementation manners, in an eighth possible implementation manner, the determining, from the N subcarriers, at least two target subcarriers that carry a target user signal, and performing initialization calculation on the target subcarriers, to obtain initialization calculation results includes: performing initialization calculation on the target subcarriers according to a received signal on the target subcarriers and channel estimation for the target subcarriers, where the received signal includes the target user signal and the associated user signals.

With reference to the eighth possible implementation manner, in a ninth possible implementation manner, there are two associated user signals, and the serial number of the first associated user signal in the K user signals is a, the serial number of the second associated user signal in the K user signals is b, and the serial number of the target user signal in the K user signals is k; and the performing initialization calculation on the target subcarriers according to a received signal on the target subcarriers and channel estimation for the target subcarriers, to obtain the initialization calculation results includes: performing initialization calculation according to the following formula, to obtain the initialization calculation result f(.);

$$f(.) = f(y_n, \alpha, \beta, i, H_n)$$
$$= \|y_{n,r1} - (h_{n,a,r1}C_a(\alpha) + h_{n,b,r1}C_b(\beta) + h_{n,k,r1}C_k(i))\| -$$
$$\|y_{n,r2} - (h_{n,a,r2}C_a(\alpha) + h_{n,b,r2}C_b(\beta) + h_{n,k,r2}C_k(i))\|$$

where n represents the serial number of the first target subcarrier of the at least two target subcarriers in the N subcarriers; $y_n$ represents a received signal on the first target subcarrier; a represents the serial number of the codeword in the codebook of the first associated user signal; β represents the serial number of the codeword in the codebook of the second associated user signal; i represents the serial number of the codeword in the codebook of the target user signal; f(.) represents the initialization calculation result of the first target subcarrier $c_n$; $H_n$ represents a channel estimation matrix for the first target subcarrier $c_n$; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the $r1^{th}$ receive antenna and provided to the first associated user signal; $h_{n,a,r2}$ represents uplink channels that are corresponding to the first target subcarrier and the $r2^{th}$ receive antenna and provided to the first associated user signal; $h_{n,b,r1}$ represents uplink channels that are corresponding to the first target subcarrier and the $r1^{th}$ receive antenna and provided to the second associated user signal; $h_{n,b,r2}$ represents uplink channels that are corresponding to the first target subcarrier and the $r2^{th}$ receive antenna and provided to the second associated user signal; $h_{n,k,r1}$ represents uplink channels that are corresponding to the first target subcarrier and the $r1^{th}$ receive antenna and provided to the target user signal; $h_{n,k,r2}$ represents uplink channels that are corresponding to the first target subcarrier and the $r2^{th}$ receive antenna and provided to the target signal; $C_a(\alpha)$ represents the $\alpha^{th}$ codeword in the codebook of the first associated user signal; $C_b(\beta)$ represents the $\beta^{th}$ codeword in the codebook of the second associated user signal; and $C_k(i)$ represents the $i^{th}$ codeword in the codebook of the target user signal.

With reference to any one of the first aspect or the first to the ninth possible implementation manners, in a tenth possible implementation manner, the determining, in a logarithm domain, a probability of each codeword in a codebook of the target user signal according to the initialization calculation results includes: determining the probability of each codeword in the codebook of the target user signal based on a Jacobi's logarithm formula and according to the initialization calculation results.

According to a second aspect, a decoding apparatus is provided, including: a receiving unit, configured to receive K user signals by using N subcarriers, where one user signal is carried on at least two subcarriers of the N subcarriers, one subcarrier carries at least two user signals of the K user signals, and 2≤N<K; an initialization unit, configured to determine, from the N subcarriers, at least two target subcarriers that carry a target user signal, and perform initialization calculation on the target subcarriers, to obtain initialization calculation results; and a first determining unit, configured to determine, in a logarithm domain, a probability of each codeword in a codebook of the target user signal according to the initialization calculation results, to decode the target user signal.

With reference to the second aspect, in a first possible implementation manner, the first determining unit obtains a first probability according to the target subcarriers, where the first probability includes a probability of each codeword in a codebook of associated user signals, and the associated user signals are all user signals, except the target user signal, of user signals carried on the target subcarriers; determines, in the logarithm domain, a second probability according to the initialization calculation results and the first probability, where the second probability includes a probability that is of each codeword in the codebook of the target user signal and that is corresponding to each of the target subcarriers; and determines the probability of each codeword in the codebook of the target user signal according to the second probability.

With reference to the first possible implementation manner of the second aspect, in a second possible implementation manner, there are two associated user signals, a serial number of a first associated user signal $q_a$ in the K user signals is a, a serial number of a second associated user signal $q_b$ in the K user signals is b, and a serial number of the target user signal $q_k$ in the K user signals is k; and the first determining unit determines the second probability according to the following formula:

$$I_{c_n \to q_k}^{log}(i) = \max_{\alpha,\beta}\{f(.) + I_{q_a \to c_n}^{log}(\alpha) + I_{q_b \to c_n}^{log}(\beta)\}, i = 1,$$

$$\ldots |C_k|, \alpha = 1, \ldots |C_a|, \beta = 1, \ldots |C_b|, n \in Z(k),$$

where $I_{c_n \to q_k}^{log}(i)$ represents a probability that is of the $i^{th}$ codeword in the codebook of the target user signal $q_k$ and that is obtained through calculation based on the target subcarrier $c_n$ of the at least two target subcarriers; n is a serial number of the target subcarrier $c_n$ in the N subcarriers; Z(k) represents a set of serial numbers of the target subcarriers in the N subcarriers; α represents a serial number of a codeword in a codebook of the first associated user signal; β represents a serial number of the codeword in a codebook of the second associated user signal; i represents a serial number of a codeword in the codebook of the target user signal; f(.) represents an initialization calculation result of the target subcarrier $c_n$; $I_{c_n \to c_k}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords included in the codebook of the target user signal $q_k$; $|C_a|$ represents a quantity of codewords included in the codebook of the first associated user signal $q_a$; $|C_b|0$ and represents a quantity of codewords included in the codebook of the second associated user signal $q_b$.

With reference to the first or the second possible implementation manner of the second aspect, in a third possible implementation manner, after the second probability is determined, the apparatus further includes: an updating unit, configured to: update, in the logarithm domain, the first probability according to the target subcarriers; and update, in the logarithm domain, the second probability according to an updated first probability, where the first determining unit determines the probability of each codeword in the codebook of the target user signal according to the updated second probability.

With reference to the third possible implementation manner of the second aspect, in a fourth possible implementation manner, the updating unit determines a third associated user signal from at least two associated user signals carried on a first target subcarrier of the at least two target subcarriers; determines an associated subcarrier according to the third associated user signal, where the associated subcarrier is a subcarrier, except the first target subcarrier, of the N subcarriers that carries the third associated user signal; and updates a probability of each codeword in a codebook of the third associated user signal according to the associated subcarrier and based on the following formula:

$$I_{q_a \to c_n}^{log}(\alpha) = \sum_{!n \in W(a)} I_{c_{!n} \to q_a}^{log}(\alpha), \alpha = 1, \ldots |C_a|$$

where $I_{q_a \to c_n}^{log}(\alpha)$ represents a probability that is of the $\alpha^{th}$ codeword in the codebook of the third associated user signal $q_a$ and that is corresponding to the first target subcarrier $c_n$ of the at least two target subcarriers; n represents a serial number of the first target subcarrier in the N subcarriers; a represents a serial number of the third associated user signal $q_a$ in the K user signals; $\alpha$ represents a serial number of a codeword in the codebook of the third associated user signal $q_a$; W(a) represents a set of a serial number of the associated subcarrier in the N subcarriers; !n represents a serial number of an associated subcarrier $c_{!n}$ in the N subcarriers; $I_{c_{!n} \to q_a}^{log}(\alpha)$ represents a probability that is of the $\alpha^{th}$ codeword in the codebook of the third associated user signal $q_a$ and that is obtained through calculation based on the associated subcarrier $c_{!n}$; and $|C_a|$ represents a quantity of codewords included in the codebook of the first associated user signal $q_a$.

With reference to the third or the fourth possible implementation manner of the second aspect, in a fifth possible implementation manner, the serial number of the target user signal $q_k$ in the K user signals is k; and the first determining unit determines the probability $Q_k^{log}(i)$ of each codeword in the codebook of the target user signal $q_k$ according to the following formula:

$$Q_k^{log}(i) = \sum_{n \in Z(k)} I_{c_n \to q_k}^{log}(i), i = 1, \ldots |C_k|$$

where i represents the serial number of the codeword in the codebook of the target user signal; n is a serial number of the target subcarrier $c_n$ of the at least two target subcarriers in the N subcarriers; Z(k) represents the set of the serial numbers of the target subcarriers in the N subcarriers; $I_{c_n \to q_k}^{log}(i)$ represents the probability that is of the $i^{th}$ codeword in the codebook of the target user signal $q_k$ and that is obtained, after updating, through calculation based on the target subcarrier $c_n$; and $|C_k|$ represents the quantity of codewords included in the codebook of the target user signal $q_k$.

With reference to any one of the second aspect or the first to the fifth possible implementation manners of the second aspect, in a sixth possible implementation manner, the apparatus further includes: a second determining unit, configured to determine, in the logarithm domain according to the probability of each codeword in the codebook of the target user signal, a log-likelihood ratio LLR corresponding to each codeword in the codebook of the target user signal.

With reference to the sixth possible implementation manner of the second aspect, in a seventh possible implementation manner, the serial number of the target user signal $q_k$ in the K user signals is k; and the second determining unit determines, according to the following formula, an LLR of a bit value of each bit in a modulation symbol corresponding to the $i^{th}$ codeword in the codebook of the target user signal, to determine an LLR corresponding to the $i^{th}$ codeword in the codebook of the target user signal:

$$LLR_x = \max_{i: u_{i,x}=0} \left( \sum_{n \in Z(k)} I_{c_n \to q_k}^{log}(i) \right) - \max_{i: u_{i,x}=1} \left( \sum_{n \in Z(k)} I_{c_n \to q_k}^{log}(i) \right), x = 1, \ldots, X$$

where $LLR_x$ represents an LLR of a bit value of the $x^{th}$ bit in the modulation symbol corresponding to the $i^{th}$ codeword in the codebook of the target user signal $q_k$; X represents a bit count of a bit value in the modulation symbol corresponding to the $i^{th}$ codeword in the codebook of the target user signal $q_k$; $I_{c_n \to q_k}^{log}(i)$ represents the probability that is of the $i^{th}$ codeword in the codebook of the target user signal $q_k$ and that is corresponding to the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; and $u_{i,x}$ represents the bit value of the $x^{th}$ bit in the modulation symbol corresponding to the $i^{th}$ codeword in the codebook of the target user signal $q_k$.

With reference to any one of the second aspect or the first to the seventh possible implementation manners of the second aspect, in an eighth possible implementation manner, the initialization unit performs initialization calculation on the target subcarriers according to a received signal on the target subcarriers and channel estimation for the target subcarriers, where the received signal includes the target user signal and the associated user signals.

With reference to the eighth possible implementation manner of the second aspect, in a ninth possible implementation manner, there are two associated user signals, the serial number of the first associated user signal in the K user signals is a, the serial number of the second associated user signal in the K user signals is b, and the serial number of the target user signal in the K user signals is k; and the initialization unit performs initialization calculation according to the following formula, to obtain the initialization calculation result f(.):

$$f(.) = f(y_n, \alpha, \beta, i, H_n)$$
$$= \|y_{n,r1} - (h_{n,a,r1} C_a(\alpha) + h_{n,b,r1} C_b(\beta) + h_{n,k,r1} C_k(i))\| -$$
$$\|y_{n,r2} - (h_{n,a,r2} C_a(\alpha) + h_{n,b,r2} C_b(\beta) + h_{n,k,r2} C_k(i))\|$$

where n represents the serial number of the first target subcarrier of the at least two target subcarriers in the N subcarriers; $y_n$ represents a received signal on the first target subcarrier; a represents the serial number of the codeword in the codebook of the first associated user signal; $\beta$ represents the serial number of the codeword in the codebook of the second associated user signal; i represents the serial number of the codeword in the codebook of the target user signal; f(.) represents the initialization calculation result of the first target subcarrier $c_n$; $H_n$ represents a channel estimation matrix for the first target subcarrier $c_n$; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the $r1^{th}$ receive antenna and provided to the first associated user signal; $h_{n,a,r2}$ represents uplink channels that are corresponding to the first target subcarrier and the $r2^{th}$ receive antenna and provided to the first associated user signal; $h_{n,b,r1}$ represents uplink channels that are corresponding to the first target subcarrier and the r1$^{th}$ receive antenna and provided to the second associated user signal; $h_{n,b,r2}$ represents uplink channels that are corresponding to the first target subcarrier and the r2$^{th}$ receive antenna and provided to the second associated user signal; $h_{n,k,r1}$ represents uplink channels that are corresponding to the first target subcarrier and the r1$^{th}$ receive antenna and provided to the target user signal; $h_{n,k,r2}$ represents uplink channels that are corresponding to the first target subcarrier and the r2$^{th}$ receive antenna and provided to the target signal; $C_a(\alpha)$ represents the $\alpha^{th}$ codeword in the codebook of the first associated user signal; $C_b(\beta)$ represents the $\beta^{th}$ codeword in the codebook of the second associated user signal; and $c_k(i)$ represents the i$^{th}$ codeword in the codebook of the target user signal.

With reference to any one of the second aspect or the first to the ninth possible implementation manners of the second aspect, in a tenth possible implementation manner, the first determining unit determines the probability of each codeword in the codebook of the target user signal based on a Jacobi's logarithm formula and according to the initialization calculation results.

Based on the foregoing technical solutions, initialization calculation may be performed on target subcarriers that carry a target user signal; and then, a probability of each codeword in a codebook of the target user signal is determined in a logarithm domain according to initialization calculation results, thereby reducing algorithm complexity and lowering a requirement for hardware.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
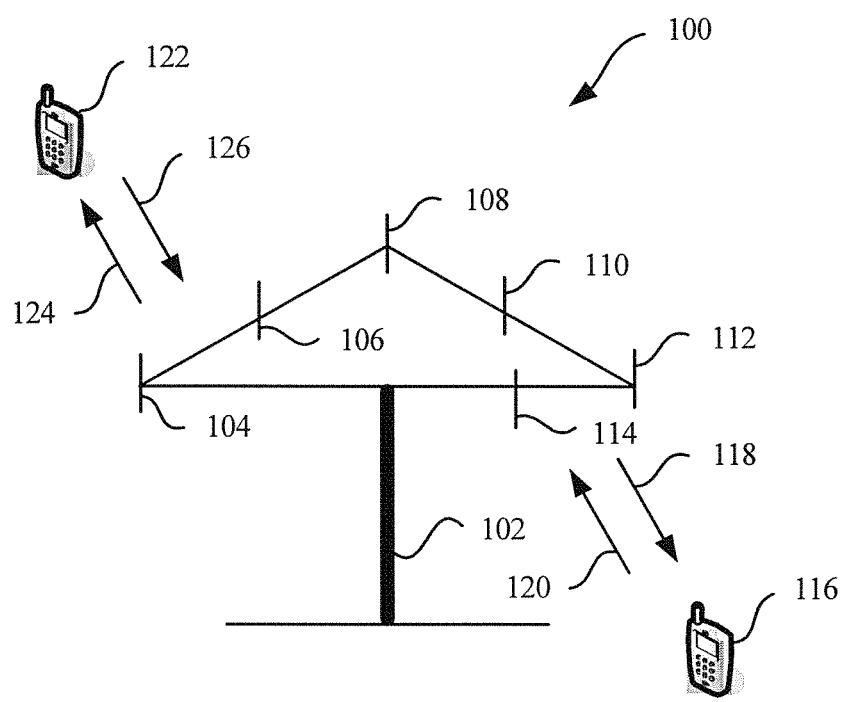
FIG. 1 is a diagram of a wireless communications system according to embodiments of this specification.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Multiple embodiments are described with reference to the accompanying drawings. A same reference numeral indicates a same component in this specification. For ease of explanation, a large quantity of specific details are provided in the following descriptions, to facilitate comprehensive understanding of one or more embodiments. However, apparently, the embodiments may also be implemented without these specific details. In other examples, a well-known structure and device are illustrated in a form of block diagrams, so as to describe one or more embodiments.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components that interact with another component in a local system, in a distributed system, and/or across a network such as the Internet interacting with other systems by using a signal).

In addition, the embodiments are described with reference to an access terminal. The access terminal may also be referred to as a system, a subscriber unit, a subscriber station, a mobile site, a mobile station, a remote station, a remote terminal, a mobile device, a user terminal, a terminal, a wireless communications device, a user agent, a user apparatus, or UE (User Equipment, user equipment). The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless communication function, a computing device, or another processing device connected to a wireless modem. In addition, the embodiments are described with reference to a base station. The base station can be configured to communicate with a mobile device. The base station may be a BTS (Base Transceiver Station, base transceiver station) in GSM (Global System for Mobile communication, Global System for Mobile Communications) or CDMA (Code Division Multiple Access, Code Division Multiple Access), or may be an NB (NodeB, NodeB) in WCDMA (Wideband Code Division Multiple Access, Wideband Code Division Multiple Access), or may be an eNB or eNodeB (Evolved Node B, evolved NodeB) in LTE (Long Term Evolution, Long Term Evolution), a relay station or an access point, a base station device in a future 5G network, or the like.

In addition, aspects or features of the present invention may be implemented as a method, an apparatus, or a product that uses standard programming and/or engineering technologies. The term "product" used in this application covers a computer program that can be accessed from any computer readable component, carrier, or medium. For example, the computer-readable medium may include but is not limited to: a magnetic storage component (for example, a hard disk, a floppy disk, or a magnetic tape), an optical disc (for example, a CD (Compact Disk, compact disk), and a DVD (Digital Versatile Disk, digital versatile disk)), a smart card, and a flash memory component (for example, an EPROM (Erasable Programmable Read-Only Memory, erasable programmable read-only memory), a card, a stick, or a key drive). In addition, various storage media described in this specification may represent one or more devices and/or other machine-readable media that are used to store information. The term "machine readable media" may include but is not limited to a radio channel, and various other media that can store, contain, and/or carry an instruction and/or data.

Currently, referring to FIG. 1, FIG. 1 shows a wireless communications system 100 according to embodiments of this specification. The wireless communications system 100 includes a base station 102. The base station 102 may include multiple antenna groups. Each antenna group may include one or more antennas. For example, an antenna group may include antennas 104 and 106, another antenna group may include antennas 108 and 110, and an additional group may include antennas 112 and 114. In FIG. 1, each antenna group has two antennas; however, each group may have more or fewer antennas. The base station 102 may additionally include a transmitter chain and a receiver chain. A person of ordinary skill in the art may understand that both the transmitter chain and the receiver chain may include multiple components related to signal sending and receiving (for example, a processor, a modulator, a multiplexer, a demodulator, a demultiplexer, or an antenna).

The base station 102 may communicate with one or more access terminals (for example, an access terminal 116 and an access terminal 122). However, it may be understood that the base station 102 may communicate with any quantity of access terminals similar to the access terminal 116 or 122. The access terminals 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100. As shown in the figure, the access terminal 116 communicates with the antennas 112 and 114. The antennas 112 and 114 send information to the access terminal 116 by using a forward link 118, and receive information from the access terminal 116 by using a reverse link 120. In addition, the access terminal 122 communicates with the antennas 104 and 106. The antennas 104 and 106 send information to the access terminal 122 by using a forward link 124, and receive information from the access terminal 122 by using a reverse link 126. In an FDD (Frequency Division Duplex, frequency division duplex) system, the forward link 118 may use a frequency band that is different from a frequency band used by the reverse link 120, and the forward link 124 may use a frequency band that is different from a frequency band used by the reverse link 126. In addition, in a TDD (Time Division Duplex, time division duplex) system, the forward link 118 and the reverse link 120 may use a same frequency band, and the forward link 124 and the reverse link 126 may use a same frequency band.

Each group of antennas and/or an area that are/is designed for communication are/is referred to as a sector of the base station 102. For example, an antenna group may be designed to communicate with an access terminal in a sector of a coverage area of the base station 102. In a process in which the base station 102 communicates with the access terminals 116 and 122 by respectively using the forward links 118 and 124, a transmit antenna of the base station 102 may improve signal-to-noise ratios of the forward links 118 and 124 by means of beamforming. In addition, in comparison with a manner in which a base station sends signals to all access terminals of the base station by using a single antenna, a manner in which the base station 102 sends, by means of beamforming, signals to the access terminals 116 and 122 that are randomly distributed in a related coverage area may bring smaller interference to a mobile device in a neighboring cell.

Within a given time, the base station 102, the access terminal 116, or the access terminal 122 may be a wireless communications sending apparatus and/or a wireless communications receiving apparatus. When sending data, the wireless communications sending apparatus may encode the data for transmission. Specifically, the wireless communications sending apparatus may obtain (for example, by means of generating, receiving from another communications apparatus, or saving in a memory) a specific quantity of data bits that are to be sent to the wireless communications receiving apparatus by using a channel. This kind of data bits may be included in a data transport block (or multiple transport blocks), and the transport block may be segmented to generate multiple code blocks.

Figure 2:
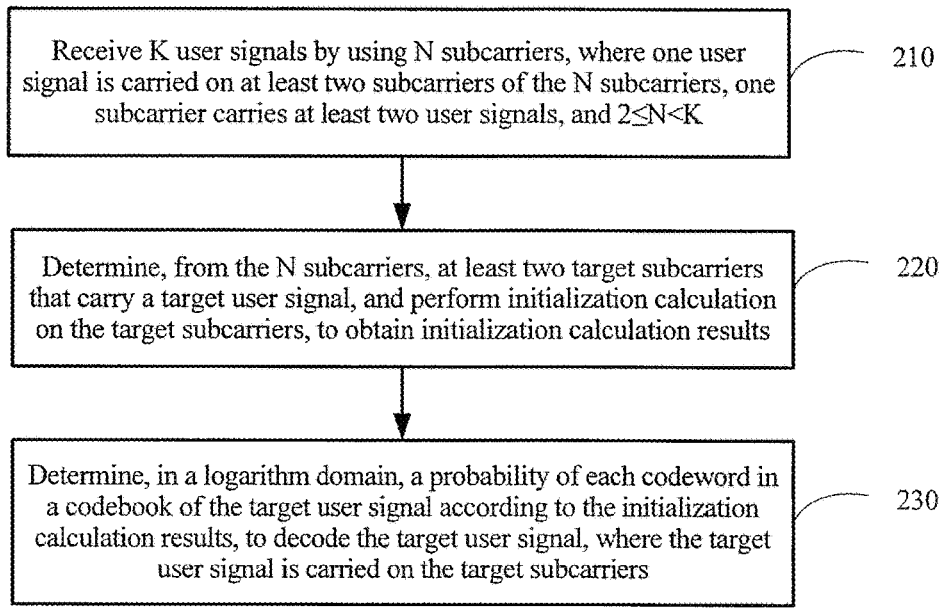
FIG. 2 is a schematic flowchart of a decoding method according to an embodiment of the present invention.

FIG. 2 is a schematic flowchart of a decoding method according to an embodiment of the present invention. The method is performed by a receiver. Specifically, the receiver may be a base station, or may be an access end. This is not limited in this embodiment of the present invention. As shown in FIG. 2, the method is performed in a logarithm domain, and the method includes the following steps:

210. Receive K user signals by using N subcarriers, where one user signal is carried on at least two subcarriers of the N subcarriers, one subcarrier carries at least two user signals, and $2 \leq N < K$.

For example, four subcarriers carry six user signals, one user signal is carried on two subcarriers of the four subcarriers, and one subcarrier carries three user signals of the six user signals.

220. Determine, from the N subcarriers, at least two target subcarriers that carry a target user signal, and perform initialization calculation on the target subcarriers, to obtain initialization calculation results.

It should be understood that the target user signal is a user signal of the K user signals, and the target subcarriers are subcarriers that carry the target user signal, and include at least two subcarriers. Specifically, initialization calculation is performed according to a received sparse code multiple access SCMA (Sparse Code Multiple Access, SCMA) signal transmitted by using the target subcarriers, to obtain the initialization calculation results corresponding to the target subcarriers.

230. Determine, in a logarithm domain, a probability of each codeword in a codebook of the target user signal according to the initialization calculation results, to decode the target user signal, where the target user signal is carried on the target subcarriers.

In other words, a probability of each codeword in a codebook of each user signal of multiple user signals corresponding to the SCMA signal is determined in the logarithm domain according to the initialization calculation results by using a message passing algorithm.

That is, a probability of each codeword in a codebook of the $k^{th}$ user signal of the K user signals is determined in the logarithm domain according to the initialization calculation results. Herein, the $k^{th}$ user signal of the K user signals is the target user signal, and k=1, . . . K.

It should be understood that the user signal in this embodiment of the present invention may be a sparse code multiple access SCMA signal. In this embodiment of the present invention, the message passing algorithm in the logarithm domain (log-MPA) is used to restore originally sent information of each user according to the received SCMA signal. A decoding manner in this embodiment of the present invention may be considered as a message passing process. The "message" herein refers to a conjecture about the target user signal. The decoding method in this embodiment of the present invention may be considered as an iterative decoding algorithm in which information passing and iteration between a variable node (VN) and a function node (FN) is performed for multiple times to implement convergence decoding.

It should be understood that the foregoing FN and VN may be actual nodes inside a receiver, or may be logical nodes. This is not limited in this embodiment of the present invention. A quantity of FNs is equal to a quantity of system resources or subcarriers, and one FN is corresponding to one subcarrier. A quantity of VNs is equal to a quantity of user signals, and one VN is corresponding to one user signal.

Therefore, in this embodiment of the present invention, initialization calculation may be performed on target subcarriers that carry a target user signal, and then, a probability of each codeword in a codebook of the target user signal is determined in a logarithm domain according to initialization calculation results, thereby reducing algorithm complexity and lowering a requirement for hardware.

Optionally, in another embodiment, the method in this embodiment of the present invention further includes: determining, in the logarithm domain according to the probability of each codeword in the codebook of the target user signal, a log-likelihood ratio LLR corresponding to each codeword in the codebook of the target user signal.

In other words, a log-likelihood ratio LLR corresponding to each codeword is determined according to the probability of each codeword in the codebook of each user signal.

Specifically, an LLR value corresponding to each codeword is determined according to a decoding result obtained by using the log-MPA, and is then passed, as input, to a Turbo (Turbo) decoder. The originally sent information of the user signal is obtained by using the Turbo decoder.

In other words, a process of decoding a signal by a receive end is a process of restoring the originally sent information of each user according to the received SCMA signal. Decoding by using the log-MPA may be a message passing process. The "message" herein refers to a conjecture about a target to-be-decoded signal. The MPA is an iterative decoding algorithm in which information passing and iteration between a variable node (VN) and a function node (EN) is performed for multiple times to achieve an effect of convergence decoding. Finally, after iteration ends, an LLR needs to be calculated, and an LLR value obtained through calculation is output to the Turbo decoder.

Therefore, in this embodiment of the present invention, initialization calculation may be performed on target subcarriers that carry a target user signal, and then, a probability of each codeword in a codebook of the target user signal is determined in a logarithm domain according to initialization calculation results, thereby reducing algorithm complexity and lowering a requirement for hardware. In other words, in this embodiment of the present invention, a received SCMA signal transmitted by using multiple subcarriers may be decoded in the logarithm domain by using a message passing algorithm, so that complexity is low, thereby reducing the requirement for hardware and improving decoding performance.

It should be understood that the foregoing FN and VN may be actual nodes inside a receiver, or may be logical nodes. This is not limited in this embodiment of the present invention. A quantity of FNs is corresponding to a quantity of system resources or that of subcarriers, and a quantity of VNs is corresponding to a quantity of user signals.

It should be further understood that the user signal in this embodiment of the present invention may be a signal flow. The signal flow may be a signal flow sent by one or more users or user equipment. The user in this embodiment of the present invention may be a virtual user. This is not limited in this embodiment of the present invention.

Optionally, in another embodiment, in 220, initialization calculation may be performed on the target subcarriers according to a received signal on the target subcarriers, and channel estimation and noise estimation for the target subcarriers. The received signal includes the target user signal and associated user signals.

For example, initialization calculation may be performed according to the received signal $y_n$, the channel estimation $H_n$, and the noise estimation $N_{o,n}$, and then the initialization calculation result f(.) is stored for use in subsequent updating.

Specifically, when there are two associated user signals, a serial number of a first associated user signal in the K user signals is a, a serial number of a second associated user signal in the K user signals is b, and a serial number of the target user signal in the K user signals is k, initialization calculation may be performed according to the following formula:

$$f(.) = f(y_n, \alpha, \beta, i, H_n)$$

$$= \frac{1}{N_{o,n,r1}} \| y_{n,r1} - (h_{n,a,r1}C_a(\alpha) + h_{n,b,r1}C_b(\beta) + h_{n,k,r1}C_k(i)) \| -$$

$$\frac{1}{N_{o,n,r2}} \| y_{n,r2} - (h_{n,a,r2}C_a(\alpha) + h_{n,b,r2}C_b(\beta) + h_{n,k,r2}C_k(i)) \|$$

where n represents a serial number of a first target subcarrier of the at least two target subcarriers in the N subcarriers; $y_n$ represents a received signal on the first target subcarrier; a represents a serial number of a codeword in a codebook of the first associated user signal; β represents a serial number of a codeword in a codebook of the second associated user signal; i represents a serial number of the codeword in the codebook of the target user signal; f(.) represents an initialization calculation result of the first target subcarrier $c_n$; $H_n$ represents a channel estimation matrix for the first target subcarrier $c_n$; $N_{o,n}$ represents noise on the $n^{th}$ subcarrier; $N_{o,n,r1}$ represents noise on the $n^{th}$ subcarrier and the $r_{1th}$ receive antenna; $N_{o,n,r2}$ represents noise on the $n^{th}$ subcarrier and the $r_{2th}$ receive antenna; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the $r1^{th}$ receive antenna and provided to the first associated user signal; $h_{n,a,r2}$ represents uplink channels that are corresponding to the first target subcarrier and the $r2^{th}$ receive antenna and provided to the first associated user signal; $h_{n,b,r1}$ represents uplink channels that are corresponding to the first target subcarrier and the $r1^{th}$ receive antenna and provided to the second associated user signal; $h_{n,b,r2}$ represents uplink channels that are corresponding to the first target subcarrier and the $r2^{th}$ receive antenna and provided to the second associated user signal; $h_{n,k,r1}$ represents uplink channels that are corresponding to the first target subcarrier and the $r1^{th}$ receive antenna and provided to the target user signal; $h_{n,k,r2}$ represents uplink channels that are corresponding to the first target subcarrier and the $r2^{th}$ receive antenna and provided to the target signal; $C_a(\alpha)$ represents the $\alpha^{th}$ codeword in the codebook of the first associated user signal; $C_n(\beta)$ represents the $\beta^{th}$ codeword in the codebook of the second associated user signal; and $C_k(i)$ represents the $i^{th}$ codeword in the codebook of the target user signal.

It should be understood that, in this embodiment of the present invention, one subcarrier may carry multiple user signals. For example, one subcarrier may carry two, three, or four user signals, or the like. A case in the foregoing embodiment of the present invention is that one subcarrier carries three user signals, but this embodiment of the present invention is not limited thereto.

It should be further understood that, in this embodiment of the present invention, there may be one or more antennas. In the foregoing embodiment of the present invention, only a case of two antennas is given. This is not limited in this embodiment of the present invention.

Alternatively, initialization calculation is performed according to a received signal on the target subcarriers and channel estimation for the target subcarriers. The received signal includes the target user signal and associated user signals.

In other words, if all antennas have same noise energy, scaling of the noise energy during subsequent calculation in the logarithm domain does not change an LLR output value. Therefore, in the method of this embodiment of the present invention, the noise energy may not need to be estimated. That is, initialization calculation may be performed on the target subcarrier according to a received signal and channel estimation that are corresponding to each subcarrier.

Specifically, when there are two associated user signals, a serial number of a first associated user signal in the K user signals is a, a serial number of a second associated user signal in the K user signals is b, and a serial number of the target user signal in the K user signals is k, initialization calculation may be performed according to the following formula:

$$f(.) = f(y_n, \alpha, \beta, i, H_n)$$
$$= \|y_{n,r1} - (h_{n,a,r1}C_a(\alpha) + h_{n,b,r1}C_b(\beta) + h_{n,k,r1}C_k(i))\| -$$
$$\|y_{n,r2} - (h_{n,a,r2}C_a(\alpha) + h_{n,b,r2}C_b(\beta) + h_{n,k,r2}C_k(i))\|$$

where n represents a serial number of a first target subcarrier of the at least two target subcarriers in the N subcarriers; $y_n$ represents a received signal on the first target subcarrier; $\alpha$ represents a serial number of a codeword in a codebook of the first associated user signal; $\beta$ represents a serial number of a codeword in a codebook of the second associated user signal; i represents a serial number of the codeword in the codebook of the target user signal; f(.) represents an initialization calculation result of the first target subcarrier $c_n$; $H_n$ represents a channel estimation matrix for the first target subcarrier $c_n$; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the $r1^{th}$ receive antenna and provided to the first associated user signal; $h_{n,a,r2}$ represents uplink channels that are corresponding to the first target subcarrier and the $r2^{th}$ receive antenna and provided to the first associated user signal; $h_{n,b,r1}$ represents uplink channels that are corresponding to the first target subcarrier and the $r1^{th}$ receive antenna and provided to the second associated user signal; $h_{n,b,r2}$ represents uplink channels that are corresponding to the first target subcarrier and the $r2^{th}$ receive antenna and provided to the second associated user signal; $h_{n,k,r1}$ represents uplink channels that are corresponding to the first target subcarrier and the $r1^{th}$ receive antenna and provided to the target user signal; $h_{n,k,r2}$ represents uplink channels that are corresponding to the first target subcarrier and the $r2^{th}$ receive antenna and provided to the target signal; $C_a(\alpha)$ represents the $\alpha^{th}$ codeword in the codebook of the first associated user signal; $C_b(\beta)$ represents the $\beta^{th}$ codeword in the codebook of the second associated user signal; and $C_k(i)$ represents the $i^{th}$ codeword in the codebook of the target user signal.

Optionally, in another embodiment, in 230, a first probability may be obtained according to the target subcarriers, where the first probability includes a probability of each codeword in a codebook of associated user signals, and the associated user signals are all user signals, except the target user signal, of user signals carried on the target subcarriers; a second probability is determined in the logarithm domain according to the initialization calculation results and the first probability, where the second probability includes a probability that is of each codeword in the codebook of the target user signal and that is corresponding to each of the target subcarriers; and the probability of each codeword in the codebook of the target user signal is determined according to the second probability.

Specifically, a subcarrier of the at least two target subcarriers that carry the target user signal may be determined from the N subcarriers. The first probability is obtained according to the subcarrier of the at least two target subcarriers, and the first probability includes a probability of each codeword that is in the codebook of the associated user signals and that is corresponding to the subcarrier of the at least two target subcarriers. The associated user signals are all user signals, except the target user signal, of user signals carried on the subcarrier of the at least two target subcarriers. The second probability is determined in the logarithm domain according to the initialization calculation results and the first probability, and the second probability includes a probability that is of each codeword in the codebook of the target user signal and that is corresponding to each subcarrier of the at least two target subcarriers. The probability of each codeword in the codebook of the target user signal is determined according to the second probability.

In other words, a second probability of each codeword in a codebook of the $z^{th}$ user signal is determined in the logarithm domain according to the initialization calculation results and a first probability of each codeword in a codebook of Z−1 user signals except the $z^{th}$ user signal of Z user signals transmitted on the $n^{th}$ subcarrier of the N subcarriers. A first probability of each codeword in a codebook that is of the $k^{th}$ user signal of the $g^{th}$ subcarrier and that is corresponding to the $k^{th}$ user signal is updated in the logarithm domain according to a second probability that is of each codeword in the codebook of the $k^{th}$ user signal and that is corresponding to each of G−1 subcarriers except the $g^{th}$ subcarrier of G subcarriers corresponding to the $k^{th}$ user signal of the K user signals. When a preset condition is met, a probability of each codeword in the codebook of the $k^{th}$ user signal is determined according to the second probability that is of each codeword in the codebook of the $k^{th}$ user signal and that is corresponding to each of the G subcarriers corresponding to the $k^{th}$ user signal.

Specifically, in 230, the probability of each codeword in the codebook of the target user signal of the K user signals may be determined in the logarithm domain according to a Jacobi's logarithm formula and the initialization calculation results.

The Jacobi's logarithm formula is as follows:

$$\log\left(\sum_{i=1}^{M} \exp(f_i)\right) \approx \max\{f_1, f_2, \ldots, f_M\}$$

where M is an integer greater than 1, and $f_i$ is any real number.

Further, when there are two associated user signals is two, the serial number of the first associated user signal $q_a$ in the K user signals is a, the serial number of the second associated user signal $q_b$ in the K user signals is b, and the serial number of the target user signal $q_k$ in the K user signals is k, the second probability may be determined according to the following formula:

$$I_{c_n \to q_k}^{log}(i) = \max_{\alpha,\beta}\{f(.) + I_{q_a \to c_n}^{log}(\alpha) + I_{q_b \to c_n}^{log}(\beta)\}, i = 1,$$

$$\ldots |C_k|, \alpha = 1, \ldots |C_a|, \beta = 1, \ldots |C_b|, n \in Z(k),$$

where $I_{c_n \to q_k}^{log}(i)$ represents a probability that is of the $i^{th}$ codeword in the codebook of the target user signal $q_k$ and that is corresponding to the target subcarrier $c_n$ of the at least two target subcarriers; n is the serial number of the target subcarrier $c_n$ in the N subcarriers; Z(k) represents a set of serial numbers of the target subcarriers in the N subcarriers; α represents the serial number of the codeword in the codebook of the first associated user signal; β represents the serial number of the codeword in the codebook of the second associated user signal; i represents the serial number of the codeword in the codebook of the target user signal; f(.) represents the initialization calculation result of the target subcarrier $c_n$; $I_{q_a \to c_n}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords included in the codebook of the target user signal $q_k$; $|C_a|$ represents a quantity of codewords included in the codebook of the first associated user signal $q_a$; and $|C_b|$ represents a quantity of codewords included in the codebook of the second associated user signal $q_b$.

It should be understood that the foregoing process may a first time of iteration in an iteration process in this embodiment of the present invention. In the first time of iteration, the first probability may be a preset probability or a probability determined according to experience.

When there is only one time of iteration, the probability of each codeword in the codebook of the target user signal may be determined according to the second probability $I_{c_n \to q_k}^{log}(i)$ determined after the first time of iteration according to the foregoing formula.

Optionally, in another embodiment, after the determining the second probability, the method in this embodiment of the present invention further includes: updating, in the logarithm domain, the first probability according to the target subcarriers; and updating, in the logarithm domain, the second probability according to an updated first probability. The determining the probability of each codeword in the codebook of the target user signal according to the second probability includes: determining the probability of each codeword in the codebook of the target user signal according to the updated second probability.

Specifically, the updating, in the logarithm domain, the first probability includes:

determining a third associated user signal from at least two associated user signals carried on a first target subcarrier of the at least two target subcarriers;

determining an associated subcarrier according to the third associated user signal, where the associated subcarrier is a subcarrier, except the first target subcarrier, of the N subcarriers that carries the third associated user signal; and updating a probability of each codeword in a codebook of the third associated user signal according to the associated subcarrier and based on the following formula:

$$I_{q_a \to c_n}^{log}(\alpha) = \sum_{!n \in W(a)} I_{c_{!n} \to q_a}^{log}(\alpha), \alpha = 1, \ldots |C_a|$$

where $I_{q_a \to c_n}^{log}(\alpha)$ represents a probability that is of the $\alpha_{th}$ codeword in the codebook of the third associated user signal $q_a$ and that is corresponding to the first target subcarrier $c_n$ of the at least two target subcarriers; n represents the serial number of the first target subcarrier in the N subcarriers; a represents a serial number of the third associated user signal $q_a$ in the K user signals; α represents a serial number of a codeword in the codebook of the third associated user signal $q_a$; W(a) represents a set of a serial number of the associated subcarrier in the N subcarriers; !n represents a serial number of an associated subcarrier $c_{!n}$ the N subcarriers; $I_{c_{!n} \to q_a}^{log}(\alpha)$ represents a probability that is of the $\alpha^{th}$ codeword in the codebook of the third associated user signal $q_a$ and that is obtained through calculation based on the associated subcarrier $c_{!n}$; and $|C_a|$ represents the quantity of codewords included in the codebook of the first associated user signal $q_a$.

It should be understood that, in actual application, the third associated user signal and the first associated user signal in this embodiment of the present invention may be a same user signal, or may be different user signals.

Further, a formula for updating the second probability according to the updated first probability is the same as the foregoing formula for determining the second probability according to the first probability. A difference is that the first probability in the foregoing formula is the updated first probability. To avoid repetition, details are not described herein.

Optionally, in another embodiment, the determining the probability of each codeword in the codebook of the target user signal according to the updated second probability includes:

determining the probability of each codeword in the codebook of the target user signal according to the following formula:

$$Q_k^{log}(i) = \sum_{n \in Z(k)} I_{c_n \to q_k}^{log}(i), i = 1, \ldots |C_k|$$

where the serial number of the target user signal $q_k$ in the K user signals is k; i represents a serial number of a codeword in the codebook of the target user signal; $I_{c_n \to q_k}^{log}(i)$ represents the probability that is of the $i^{th}$ codeword in the codebook of the target user signal $q_k$ and that is obtained, after updating, through calculation based on the target subcarrier $c_n$; n is the serial number of the target subcarrier $c_n$ in the N subcarriers; Z(k) represents the set of the serial numbers of the target subcarriers in the N subcarriers; and $|C_k|$ represents a quantity of codewords included in the codebook of the target user signal $q_k$.

It should be understood that the updated second probability is a second probability during iteration convergence, or a second probability in the last time of iteration in a preset quantity of iteration times.

When there is only one time of iteration, the probability of each codeword in the codebook of the target user signal may be determined according to a second probability determined after the first time of iteration. Calculation may also be performed according to the foregoing formula. A difference is that the second probability is a second probability obtained through the first time of iteration.

Optionally, in another embodiment, an LLR of a bit value of each bit in a modulation symbol corresponding to the $i^{th}$ codeword in the codebook of the target user signal may be determined according to the following formula, to determine an LLR corresponding to the $i^{th}$ codeword in the codebook of the target user signal:

$$LLR_x = \max_{i:u_{i,x}=0}\left(\sum_{n \in Z(k)} I_{c_n \to q_k}^{log}(i)\right) - \max_{i:u_{i,x}=1}\left(\sum_{n \in Z(k)} I_{c_n \to q_k}^{log}(i)\right), x = 1, \ldots, X$$

where $I_{c_n \to q_k}^{log}(i)$ represents the probability that is of the $i^{th}$ codeword in the codebook of the target user signal $q_k$ and that is obtained, after updating, through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; X represents a bit count of a bit value in the modulation symbol corresponding to the $i^{th}$ codeword in the codebook of the target user signal; $LLR_x$ represents an LLR of a bit value of the $x^{th}$ bit in the modulation symbol corresponding to the $i^{th}$ codeword in the codebook of the $k^{th}$ user signal; and $u_{i,x}$ represents the bit value of the $x^{th}$ bit in the modulation symbol corresponding to the $i^{th}$ codeword in the codebook of the target user signal.

For example, when the modulation symbol is a quaternary phase modulation symbol of QPSK, the modulation symbol may be 00, 01, 11, or 10, X=2, and x is equal to 1 or 2.

The following describes this embodiment of the present invention in further detail with reference to a specific example. It should be noted that the example in FIG. 2 is merely intended to help a person skilled in art understand the embodiments of the present invention rather than restrict the embodiments of the present invention to an exemplary specific numerical value or specific scenario. Apparently, a person skilled in the art can perform various equivalent modifications or changes according to an example provided in FIG. 3, and such modifications or changes also fall within the scope of the embodiments of the present invention.

Figure 3:
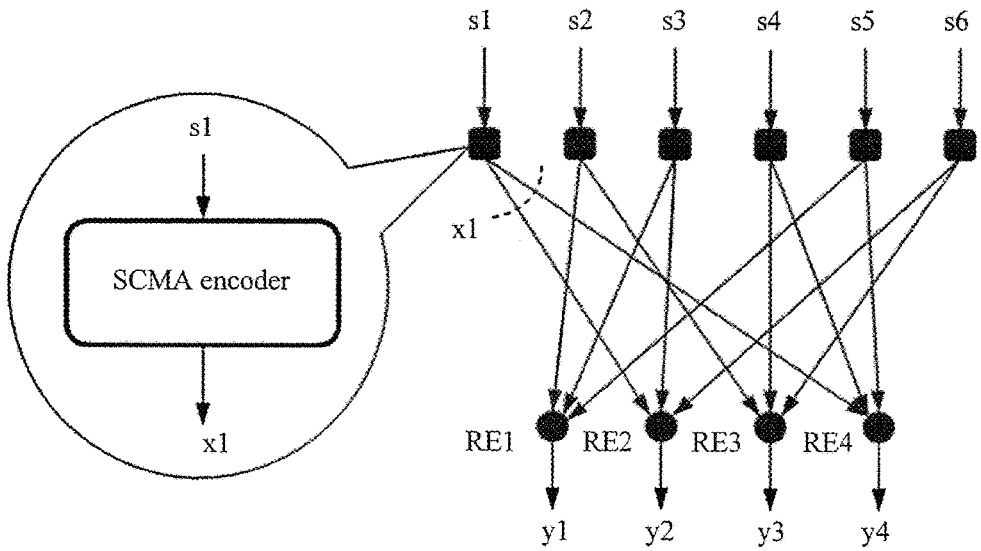
FIG. 3 is a schematic diagram of SCMA encoding according to an embodiment of the present invention.

Specifically, for example, transmission after encoding may be performed by using a sparse code multiple access (Sparse Code Multiple Access, SCMA) technology. Specifically, in SCMA, an original signal is "sparsely" spread to a frequency domain. Generally, spreading each signal to REs whose quantity is less than or equal to half a total quantity of REs is referred to as sparse frequency spreading. For example, modulation signals of six users are transmitted by using four REs. A modulation signal of each user (each modulation signal) may be spread to two (4/2) REs for transmission. In SCMA encoding, this type of spreading may be implemented by performing phase rotation or power distribution on a basis of conventional modulation. Specifically, description is provided with reference to a specific example in FIG. 3. FIG. 3 is a schematic diagram of SCMA encoding according to an embodiment of the present invention. FIG. 3 shows a case in which QPSK modulation signals of six users use independent codebooks to be separately spread to four REs for transmission. Specifically, each of s1 to s6 represents a QPSK modulation signal of a user, each of RE1 to RE4 represents a system resource, and y1 to y4 respectively represent signals transmitted on subcarriers corresponding to the system resources RE1 to RE4. As shown in FIG. 3, each modulation signal uses an independent codebook to be spread to two REs for transmission. For example, as shown in FIG. 3, a modulation signal s1 of a user is transmitted on the system resource RE2 and the system resource RE4 by using a codebook that is of an SCMA encoder and whose serial number is x1.

Figure 4:
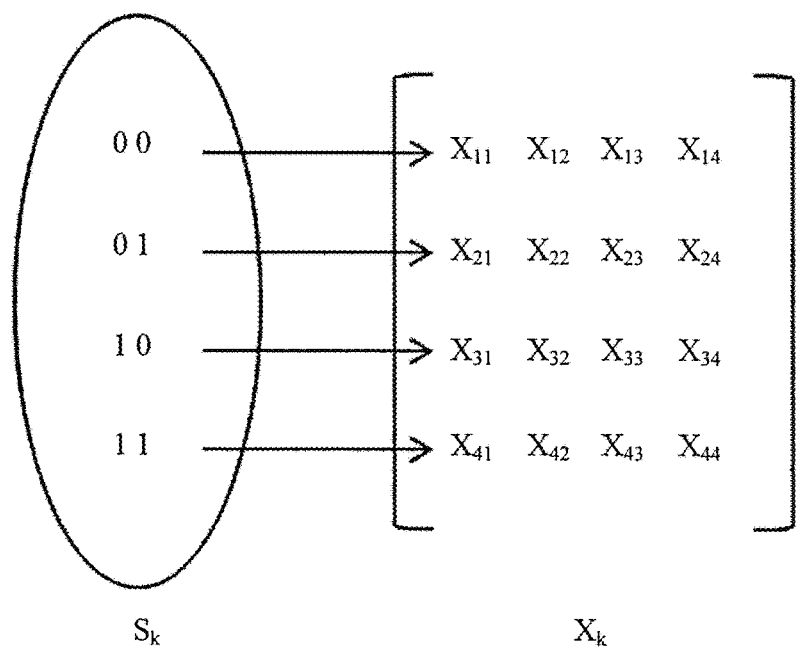
FIG. 4 is a schematic diagram of SCMA encoding according to another embodiment of the present invention.

In other words, as shown in FIG. 4, SCMA encoding in the embodiment of FIG. 3 is mapping an input signal set $s_k$ of a user k as a matrix $X_k$, that is, $f_k: s_k \to X_k$, where $X_k$ is referred to as an SCMA codebook of the user k.

For example, a correspondence between users and REs in FIG. 3 is used as an example, and then user codebooks represented by using standard QPSK constellation points may be as follows:

$$C1 = \frac{1}{\sqrt{2}}\begin{bmatrix} 0 & 0 & 0 & 0 \\ 1+i & -1+i & -1-i & 1-i \\ 1-i & 1+i & -1+i & -1-i \\ 0 & 0 & 0 & 0 \end{bmatrix}$$

$$C2 = \frac{1}{\sqrt{2}}\begin{bmatrix} 1+i & -1+i & -1-i & 1-i \\ 0 & 0 & 0 & 0 \\ 0 & 0 & 0 & 0 \\ -1-i & 1-i & 1+i & -1+i \end{bmatrix}$$

-continued $$C3 = \frac{1}{\sqrt{2}}\begin{bmatrix} -1-i & 1-i & 1+i & -1+i \\ 0 & 0 & 0 & 0 \\ -1+i & -1-i & 1-i & 1+i \\ 0 & 0 & 0 & 0 \end{bmatrix}$$

$$C4 = \frac{1}{\sqrt{2}}\begin{bmatrix} 0 & 0 & 0 & 0 \\ 0 & 0 & 0 & 0 \\ -1+i & -1-i & 1-i & 1+i \\ -1-i & 1-i & 1+i & -1+i \end{bmatrix}.$$

$$C5 = \frac{1}{\sqrt{2}}\begin{bmatrix} 0 & 0 & 0 & 0 \\ -1-i & 1-i & 1+i & -1+i \\ 1+i & -1+i & -1-i & 1-i \\ 0 & 0 & 0 & 0 \end{bmatrix}$$

$$C6 = \frac{1}{\sqrt{2}}\begin{bmatrix} 0 & 0 & 0 & 0 \\ -1-i & 1-i & 1+i & -1+i \\ 1+i & -1+i & -1-i & 1-i \\ 0 & 0 & 0 & 0 \end{bmatrix}$$

where C1 to C6 are respectively codebooks of modulation signals of the first to the sixth users. A codeword in a codebook of each user signal is a column of a matrix. For example,
in the codebook C1

$$C1 = \frac{1}{\sqrt{2}}\begin{bmatrix} 0 & 0 & 0 & 0 \\ 1+i & -1+i & -1-i & 1-i \\ 1-i & 1+i & -1+i & -1-i \\ 0 & 0 & 0 & 0 \end{bmatrix},$$

the second codeword is $C_1(2) = [0\ -1+i\ 1+i\ 0]^T$ corresponding to the second column in the C1 codebook.

Figure 5:
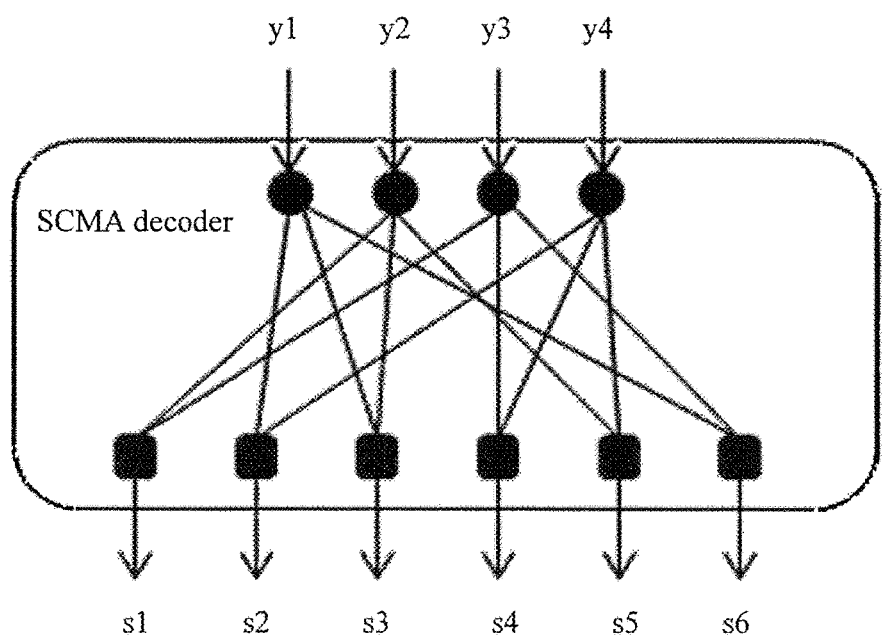
FIG. 5 is a schematic flowchart of a decoding method according to another embodiment of the present invention.

A process of decoding a signal by a receiver is a process of restoring originally sent information of each user according to a received SCMA signal. As shown in FIG. 5, a receiver decodes received encoded signals y1 to y4 transmitted on four subcarriers, to restore originally sent information s1 to s6 of users.

Figure 6:
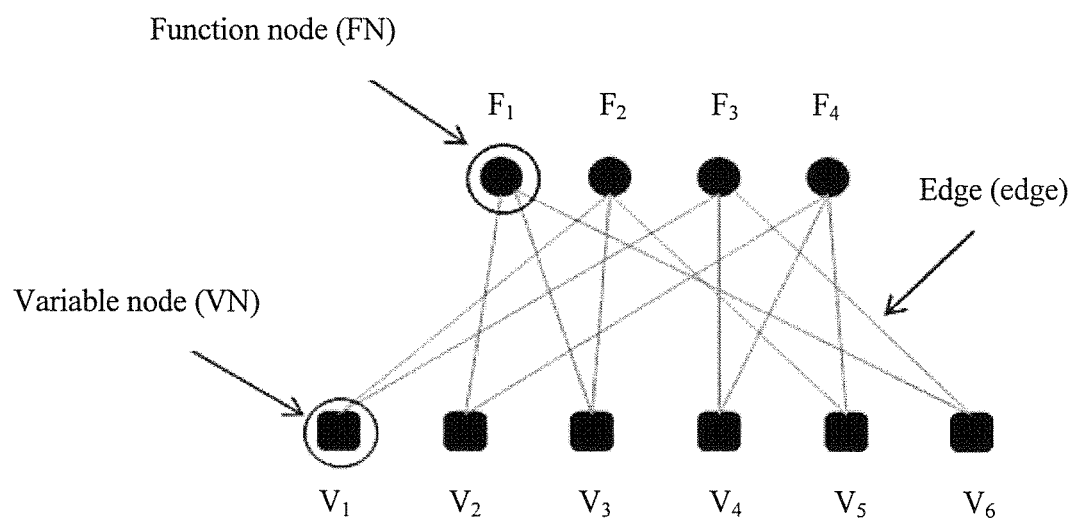
FIG. 6 is a schematic flowchart of a decoding method according to another embodiment of the present invention.

Specifically, according to the example in FIG. 5, as shown in FIG. 6, four subcarriers are defined to be respectively corresponding to four function nodes (Function Node, FN) that are respectively F1 to F4, and six users are defined to be respectively corresponding to six variable nodes (Variable Node, VN) that are respectively V1 to V6. One FN is corresponding three VNs; in other words, one VN is corresponding to two FNs. According to a definition, there is an edge (edge) between an FN and a corresponding VN during decoding. Therefore, as shown in FIG. 6, there are 12 edges. One FN is corresponding to three VNs by using three edges, and one VN is corresponding to two FNs by using two edges.

It should be understood that the FN and the VN in FIG. 6 may be actual nodes inside a receiver, or may be logical nodes. This is not limited in this embodiment of the present invention. A quantity of FNs is corresponding to a quantity of system resources or that of subcarriers, and a quantity of VNs is corresponding to a quantity of user signals.

Figure 7:
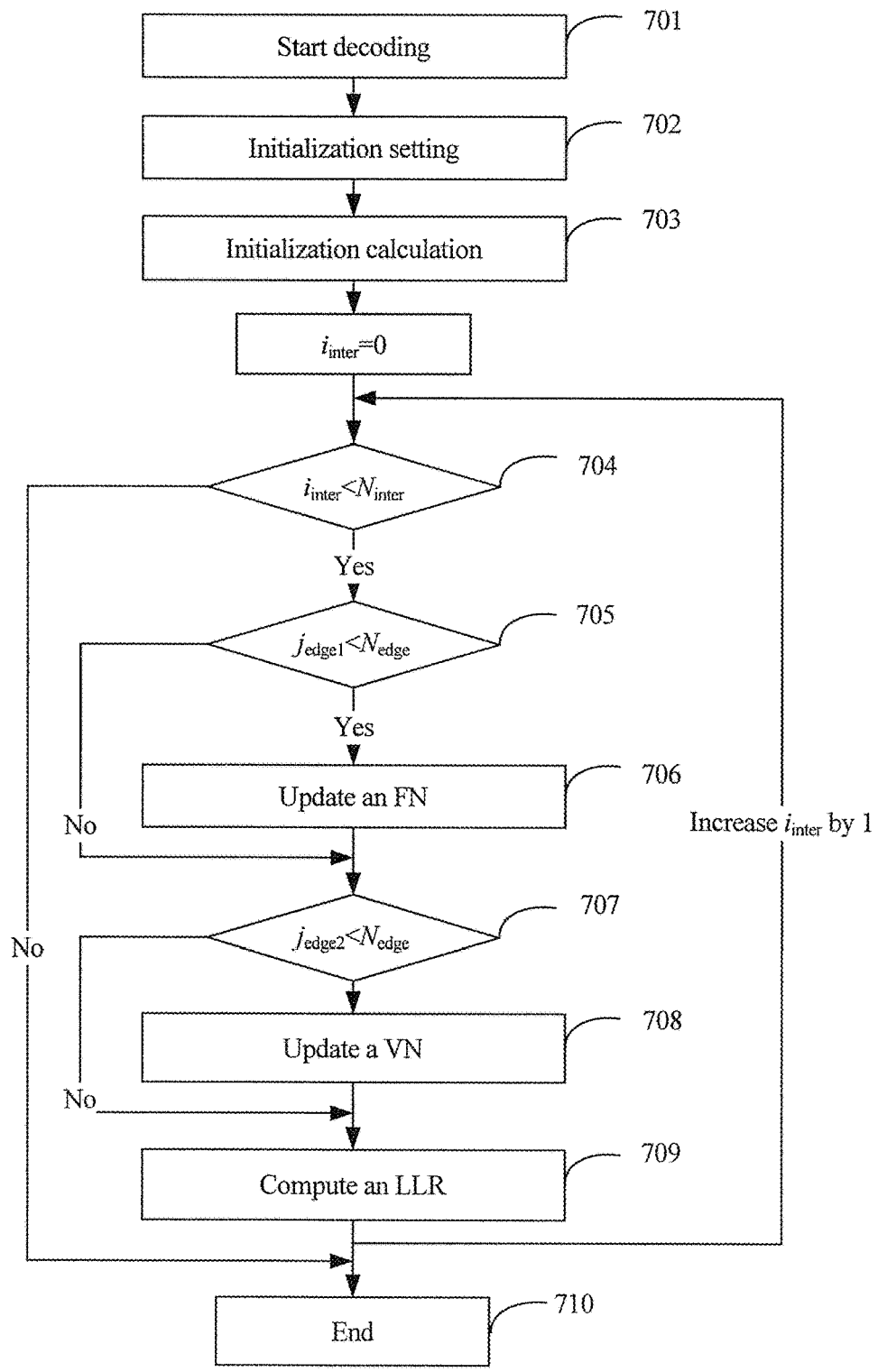
FIG. 7 is a schematic flowchart of a decoding method according to another embodiment of the present invention.

Specifically, detailed description is provided with reference to FIG. 7 according to the scenarios shown in FIG. 5 and FIG. 6. FIG. 7 is a schematic flowchart of a decoding method according to another embodiment of the present invention. It should be understood that, in this embodiment of the present invention, a quantity of VNs is 6; in other words, K=6, which indicates that there are six user signals in total; a quantity of FNs is 4; in other words, N=4, which indicates that there are four subcarriers in total. The $n^{th}$ subcarrier of the N subcarriers, for example, an FN, may be selected as an example for description. For example, when a target user signal is the second user signal V2, that is, when the $k^{th}$ user signal is the second user signal, target subcarriers may be the first subcarrier and the fourth subcarrier, and a subcarrier (the $n^{th}$ subcarrier) of the target subcarriers may be the first subcarrier F1. In this case, V2, V3, and V6 corresponding to the $n^{th}$ subcarrier (FN,F1) are respectively the $k^{th}$ user signal (VNk), the $a^{th}$ user signal (VNa), and the $b^{th}$ user signal (VNb). As shown in FIG. 7, the decoding method includes the following steps.

701. Start decoding.

702. Perform initialization setting.

Specifically, a first probability of each codeword may be initially set. For example, the first probabilities of all the codewords are 1/M. Herein, the probability of each codeword may be initially set to ¼.

703. Perform initialization calculation.

Specifically, initialization calculation may be performed according to the following formula:

$$f(.) = f(y_n, \alpha, \beta, i, N_{o,n}, H_n)$$
$$= \frac{1}{N_{o,n,r1}}\|y_{n,r1} - (h_{n,a,r1}C_a(\alpha) + h_{n,b,r1}C_b(\beta) + h_{n,k,r1}C_k(i))\|^2 -$$
$$\frac{1}{N_{o,n,r2}}\|y_{n,r2} - (h_{n,a,r2}C_a(\alpha) + h_{n,b,r2}C_b(\beta) + h_{n,k,r2}C_k(i))\|^2$$

where n represents a serial number of a first target subcarrier of at least two target subcarriers in N subcarriers; $y_n$ represents a received signal on the first target subcarrier; α represents a serial number of a codeword in a codebook of a first associated user signal; β represents a serial number of a codeword in a codebook of a second associated user signal; i represents a serial number of a codeword in a codebook of a target user signal; f(.) represents an initialization calculation result of the first target subcarrier $c_n$; $H_n$ represents a channel estimation matrix for the first target subcarrier $c_n$; $N_{o,n}$ represents noise on the $n^{th}$ subcarrier; $N_{o,n,r1}$ represents noise on the $n^{th}$ subcarrier and the $r_{1th}$ receive antenna; $N_{o,n,r2}$ represents noise on the $n^{th}$ subcarrier and the $r_{2th}$ receive antenna; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the $r1^{th}$ receive antenna and provided to the first associated user signal; $h_{n,a,r2}$ represents uplink channels that are corresponding to the first target subcarrier and the $r2^{th}$ receive antenna and provided to the first associated user signal; $h_{n,b,r1}$ represents uplink channels that are corresponding to the first target subcarrier and the $r1^{th}$ receive antenna and provided to the second associated user signal; $h_{n,b,r2}$ represents uplink channels that are corresponding to the first target subcarrier and the $r2^{th}$ receive antenna and provided to the second associated user signal; $h_{n,k,r1}$ represents uplink channels that are corresponding to the first target subcarrier and the $r1^{th}$ receive antenna and provided to the target user signal; $h_{n,k,r2}$ represents uplink channels that are corresponding to the first target subcarrier and the r2$^{th}$ receive antenna and provided to the target signal; $C_a(\alpha)$ represents the $\alpha^{th}$ codeword in the codebook of the first associated user signal; $C_b(\beta)$ represents the $\beta^{th}$ codeword in the codebook of the second associated user signal; and $C_k(i)$ represents the $i^{th}$ codeword in the codebook of the target user signal.

Three inputs are required for obtaining the initialization calculation result f(.) through calculation, and are separately the received signal $y_n$, the channel estimation $H_n$, and the noise estimation $N_{o,n}$. Herein, the calculated f(.) needs to be stored for use in subsequent iterative updating.

704. Determine whether $i_{inter}$ is less than a quantity $N_{inter}$ of iteration times.

$i_{inter}$ is a number of current iteration, and $N_{inter}$ is a total quantity of iteration times. Specifically, when $i_{inter}$=0 initially, if $i_{inter}$ is less than the total quantity $N_{inter}$ of iteration times, step 705 is performed; or if $i_{inter}$ is not less than the total quantity $N_{inter}$ of iteration times, step 710 is performed.

705. Determine whether $j_{edge1}$ is less than a total quantity $N_{edge}$ of edges.

In other words, whether all FNs complete updating is determined, or whether all edges are traversed for FN updating is determined. $j_{edge1}$ represents a current quantity of updated edges, and $N_{edge}$ represents the total quantity of edges. Specifically, if $j_{edge1}$ is less than the total quantity $N_{edge}$ of edges, step 706 is performed; or if $j_{edge1}$ is not less than the total quantity $N_{edge}$ of edges, step 707 is performed.

706. Perform FN updating.

In other words, a first probability of each codeword in a codebook of Z-1 user signals except the $z^{th}$ user signal of Z user signals corresponding to each subcarrier is determined according to the initialization calculation results, and a second probability of each codeword in a codebook of the $z^{th}$ user signal is determined. For example, in this embodiment of the present invention, Z=3. If V2 corresponding to F1 is updated, the $z^{th}$ user signal is corresponding to V2, and Z-1 user signals are corresponding to V3 and V6.

Specifically, the second probability may be determined according to the following formula:

$$I_{c_n \to q_k}^{log}(i) = \max_{\alpha, \beta}\{f(.) + I_{q_a \to c_n}^{log}(\alpha) + I_{q_b \to c_n}^{log}(\beta)\},$$

$$i = 1, \ldots |C_k|, \alpha = 1, \ldots |C_a|, \beta = 1, \ldots |C_b|$$

where $I_{c_n \to q_k}^{log}(i)$ represents a probability that is of the $i^{th}$ codeword in the codebook of the target user signal $q_k$ and that is obtained through calculation based on the target subcarrier $c_n$ of the at least two target subcarriers; n is the serial number of the target subcarrier $c_n$ in the N subcarriers; Z(k) represents a set of serial numbers of the target subcarriers in the N subcarriers; $\alpha$ represents the serial number of the codeword in the codebook of the first associated user signal; $\beta$ represents the serial number of the codeword in the codebook of the second associated user signal; i represents the serial number of the codeword in the codebook of the target user signal; f(.) represents the initialization calculation result of the target subcarrier $c_n$; $I_{q_a \to c_n}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords included in the codebook of the target user signal $q_k$; $|C_a|$ represents a quantity of codewords included in the codebook of the first associated user signal $q_a$; and $|C_b|$ represents a quantity of codewords included in the codebook of the second associated user signal $q_b$.

In this embodiment of the present invention, $|C_a|$, $|C_k|$, and $|C_b|$ are all equal to 4.

Specifically, in the method in this embodiment of the present invention, an approximation relationship of a Jacobi's logarithm formula (Jacobi's logarithm) may be used:

$$\log\left(\sum_{i=1}^{N} \exp(f_i)\right) \approx \max\{f_1, f_2, \ldots, f_N\}$$

where $f_i$ is any real number. To ensure accuracy of approximation, $f_i$ needs to meet a specific condition (for example, $|f_i|>1$).

In this case, according to the Jacobi's logarithm formula, it may be assumed that:

$$I_{c_n \to q_k}^{log}(i) = \log(I_{c_n \to q_k}(i))$$

$$I_{q_a \to c_n}^{log}(\alpha) = \log(I_{q_a \to c_n}(\alpha))$$

$$I_{q_b \to c_n}^{log}(\beta) = \log(I_{q_b \to c_n}(\beta))$$

According to the foregoing equations, in this embodiment of the present invention may be deduced according to the following formula:

$$I_{c_n \to q_k}^{log}(i) = \max_{\alpha, \beta}\{f(.) + I_{q_a \to c_n}^{log}(\alpha) + I_{q_b \to c_n}^{log}(\beta)\}$$

$$= \log\sum_{\alpha=1}^{|C_a|}\sum_{\beta=1}^{|C_b|} \phi_n(y_n, \alpha, \beta, i, N_{o,n}, H_n)\left(I_{q_a \to c_n}^{log}(\alpha) I_{q_b \to c_n}^{log}(\beta)\right)$$

$$= \log\sum_{\alpha=1}^{|C_a|}\sum_{\beta=1}^{|C_b|} \exp(f(y_n, \alpha, \beta, i, N_{o,n}, H_n)\phi_n + I_{q_a \to c_n}^{log}(\alpha) +$$

$$I_{q_b \to c_n}^{log}(\beta))$$

$$\approx \max_{\alpha, \beta}\{f(.) + I_{q_a \to c_n}^{log}(\alpha) + I_{q_b \to c_n}^{log}(\beta)\}$$

where the function $\phi_n(\bullet)$ represents a conditional channel probability CCP (Conditional Channel Probability) of $C_k(i)$, and $$\phi_n(y_n, \alpha, \beta, i, N_{o,n}, H_n)$$

$$= \exp(f(y_n, \alpha, \beta, i, N_{o,n}, H_n))$$

$$= \exp\left(\frac{1}{N_{o,n,r1}}\|y_{n,r1} - (h_{n,a,r1}C_a(\alpha) + h_{n,b,r1}C_b(\beta) + h_{n,k,r1}C_k(i))\|^2 - \frac{1}{N_{o,n,r2}}\|y_{n,r2} - (h_{n,a,r2}C_a(\alpha) + h_{n,b,r2}C_b(\beta) + h_{n,k,r2}C_k(i))\|^2\right).$$

A second probability of each codeword in a codebook of each user signal of multiple user signals corresponding to each subcarrier is determined according to the foregoing method.

In other words, in the foregoing formula, n=1, . . . , N are traversed to complete updating of all subcarriers. In addition, one time of FN updating is completed after the first to the sixth user signals are traversed as a target user signal. N represents a quantity of subcarriers. In this embodiment of the present invention, N=4, which indicates that there are four subcarriers in total.

707. Determine whether $j_{edge2}$ is less than the total quantity $N_{edge}$ of edges.

In other words, whether all VNs complete updating is determined, or whether all edges are traversed for VN updating is determined. $j_{edge2}$ represents a current quantity of updated edges, and $N_{edge}$ represents the total quantity of edges. Specifically, if $j_{edge2}$ is less than the total quantity $N_{edge}$ of edges, step 708 is performed; or if $j_{edge2}$ is not less than the total quantity $N_{edge}$ of edges, step 709 is performed.

708. Update a VN.

In other words, a first probability of each codeword in a codebook that is of each user signal of the $g^{th}$ subcarrier and that is corresponding to each user signal is updated according to a second probability that is of each codeword in the codebook of each user signal and that is corresponding to each of G−1 subcarriers except the $g^{th}$ subcarrier of G subcarriers corresponding to each user signal of all the user signals. For example, in this embodiment of the present invention, G=2. If F1 corresponding to V1 is updated, the $g^{th}$ subcarrier is corresponding to F1, and the G−1 subcarriers are corresponding to F3.

Specifically, after one time of FN updating is completed, a VN needs to update a first probability in a logarithm domain according to a second probability passed from an FN (connected to the VN), and then pass the first probability to the corresponding FN.

Specifically, a third associated user signal is determined from at least two associated user signals carried on the first target subcarrier of the at least two target subcarriers. An associated subcarrier is determined according to the third associated user signal, and the associated subcarrier is a subcarrier, except the first target subcarrier, of the N subcarriers that carries the third associated user signal. A probability of each codeword in a codebook of the third associated user signal is updated according to the associated subcarrier and based on the following formula:

$$I^{log}_{q_a \to c_n}(\alpha) = \sum_{!n \in W(a)} I^{log}_{c_{!n} \to q_a}(\alpha), \alpha = 1, \ldots |C_a|$$

where $I^{log}_{q_a \to c_n}(\alpha)$ represents a probability that is of the $\alpha^{th}$ codeword in the codebook of the third associated user signal $q_a$ and that is corresponding to the first target subcarrier $c_n$ of the at least two target subcarriers; n represents the serial number of the first target subcarrier in the N subcarriers; a represents a serial number of the third associated user signal $q_a$ in K user signals; α represents a serial number of a codeword in the codebook of the third associated user signal $q_a$; W(a) represents a set of a serial number of the associated subcarrier in the N subcarriers; !n represents a serial number of an associated subcarrier $c_{!n}$ in the N subcarriers; $I^{log}_{c_{!n} \to q_a}(\alpha)$ presents a probability that is of the $\alpha^{th}$ codeword in the codebook of the third associated user signal $q_a$ and that is obtained through calculation based on the associated subcarrier $c_{!n}$; $I^{log}_{q_a \to c_n}(\alpha)$ and represents the probability that is of the $\alpha^{th}$ codeword in the codebook of the third associated user signal $q_a$ and that is corresponding to the first target subcarrier $c_n$; and $|C_a|$ represents a quantity of codewords included in the codebook of the first associated user signal $q_a$.

It should be noted that the third associated user signal and the first associated user signal are a same user signal. For example, when the target user signal is the second user signal, and the target subcarrier is the first subcarrier, the first associated user signal and the third associated user signal are both the third user signal, and the associated subcarrier is the second subcarrier.

According to the foregoing embodiment, subcarriers corresponding to the third user signal are the first subcarrier and the second subcarrier, so that the following can be obtained:

$$I^{log}_{c_1 \to q_3}(i) = I^{log}_{c_2 \to q_3}(i).$$

Similarly, a probability of each codeword in a codebook of each user signal of multiple user signals corresponding to each subcarrier may be determined according to the method in the foregoing embodiment.

In other words, in the foregoing formula, n=1, ..., N are traversed to complete updating of all subcarriers.

In addition, one time of VN updating is completed after the first to the sixth user signals are traversed as a target user signal.

That is, one iteration process is completed only after one time of FN and VN updating is completed. Then, the foregoing process is repeated. Iteration stops after a preset quantity $N_{inter}$ of iteration times is reached, for example, $N_{inter}$ is equal to 3, 4, or 5, and an LLR is output. Specifically, reference may be made to step 709.

709. Calculate an LLR.

Iteration stops at iteration convergence or when a quantity of iteration times reaches $N_{inter}$, and an LLR is output. Then, the LLR output result is used as input of a Turbo (Turbo) decoder, and a signal of each user is obtained by using the Turbo decoder.

It should be understood that, in this embodiment of the present invention, iteration may stop at iteration convergence; or a quantity of iteration times may be preset, and iteration stops when the quantity of iteration times is reached. For example, the quantity of iteration times is 3, 4, or 5. Then, an iteration result is output as an LLR.

An LLR of a bit value of each bit in a modulation symbol corresponding to the $i^{th}$ codeword in the codebook of the target user signal is determined according to the following formula:

$$LLR_x = \max_{i:u_{i,x}=0} \left( \sum_{n \in Z(k)} I^{log}_{c_n \to q_k}(i) \right) - \max_{i:u_{i,x}=1} \left( \sum_{n \in Z(k)} I^{log}_{c_n \to q_k}(i) \right),$$

$$x = 1, \ldots, X$$

where $I^{log}_{c_n \to q_k}(i)$ represents the probability that is of the $i^{th}$ codeword in the codebook of the target user signal $q_k$ and that is obtained, after updating, through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; X represents a bit count of a bit value in the modulation symbol corresponding to the $i^{th}$ codeword in the codebook of the target user signal; $LLR_x$ represents an LLR of a bit value of the $x^{th}$ bit in the modulation symbol corresponding to the $i^{th}$ codeword in the codebook of the $k^{th}$ user signal; and $u_{i,x}$ represents the bit value of the $x^{th}$ bit in the modulation symbol corresponding to the $i^{th}$ codeword in the codebook of the target user signal.

Specifically, the entire algorithm is performed in the logarithm domain. Therefore, a value in the logarithm domain needs to be restored to a probability domain during decoding output. In this case, the approximation relationship of the Jacobi's logarithm formula may be used again. It is assumed that:

$$Q_k^{log}(i) = \log(Q_k(i)).$$

According to the foregoing equations the LLRx in this embodiment of the present invention may be deduced according to the following formula:

$$\begin{aligned}
LLR_X &= \log\left(\sum_{i:u_{i,x}=0} Q_k(i)\right) - \log\left(\sum_{i:u_{i,x}=1} Q_k(i)\right) \\
&= \log\left(\sum_{i:u_{i,x}=0} \exp(Q_k^{log}(i))\right) - \log\left(\sum_{i:u_{i,x}=1} \exp(Q_k^{log}(i))\right) \\
&\approx \max_{i:u_{i,x}=0}(Q_k^{log}(i)) - \max_{i:u_{i,x}=1}(Q_k^{log}(i)) \\
&= \max_{i:u_{i,x}=0}\left(\sum_{n\in Z(k)} I_{c_n \to q_k}^{log}(i)\right) - \max_{i:u_{i,x}=1}\left(\sum_{n\in Z(k)} I_{c_n \to q_k}^{log}(i)\right).
\end{aligned}$$

After step 709 is completed, a value of $i_{inter}$ needs to increase by 1, and then step 704 is performed.

710. Complete decoding.

It should be understood that FIG. 7 of the embodiments of the present invention provides only a case in which six user signals are carried on four subcarriers. However, the embodiments of the present invention are not limited thereto. Apparently, a person skilled in the art can perform various equivalent modifications or changes according to examples provided in the figures, and such modifications or changes also fall within the scope of the embodiments of the present invention.

Figure 8:
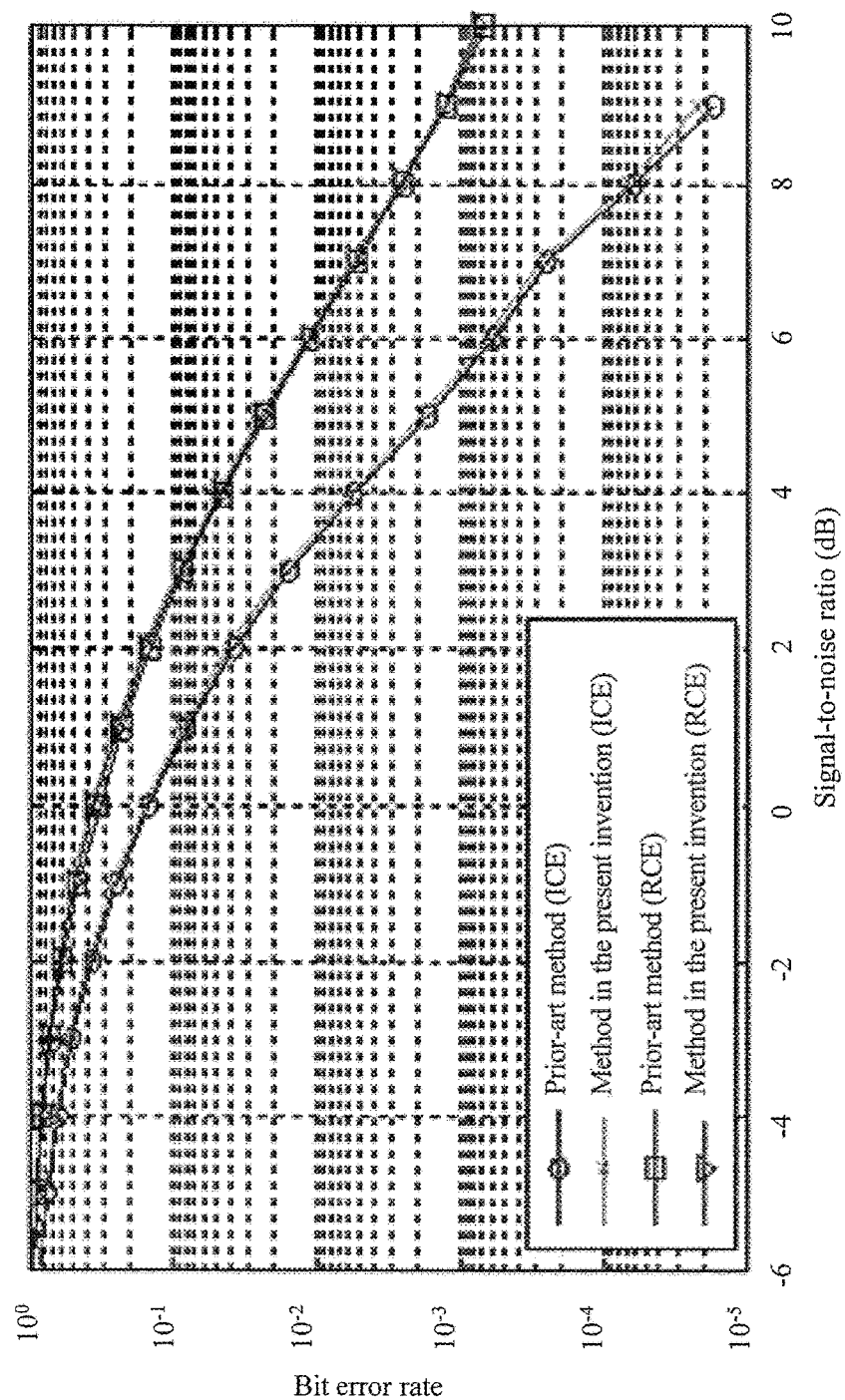
FIG. 8 is a schematic diagram of a performance simulation result of a decoding method based on an embodiment of the present invention.

FIG. 8 is a schematic diagram of a performance simulation result of a decoding method based on an embodiment of the present invention. In an example in which there are four subcarriers and six user signals, FIG. 8 shows a result of comparison between a bit error rate in a prior-art method and that in a decoding method that is in the embodiments of the present invention and in which an MPA in a logarithm domain is used. FIG. 8 includes a comparison result in ideal channel estimation ICE and that in real channel estimation RCE. As shown in FIG. 8, according to the decoding method in the embodiments of the present invention, decoding performance can be improved.

Figure 9:
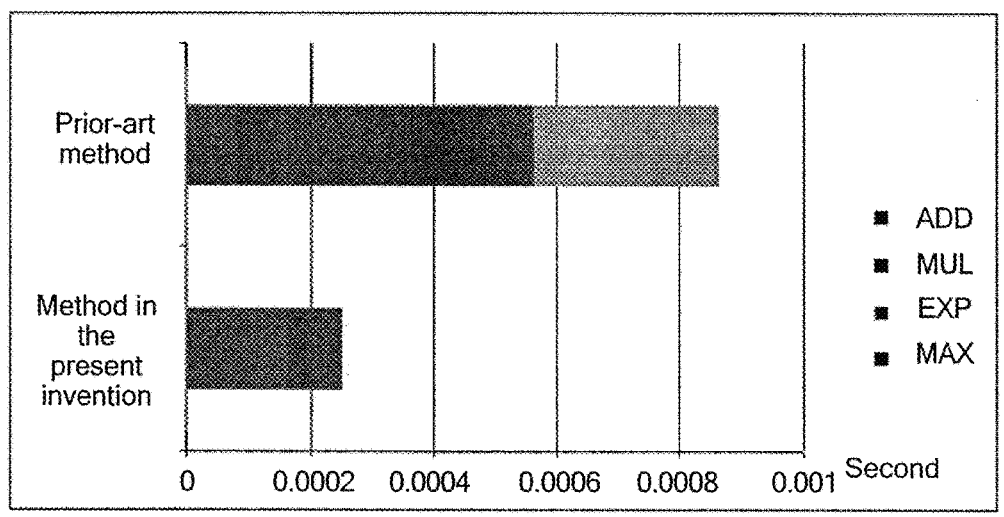
FIG. 9 is a schematic diagram of a decoding time simulation result of a decoding method based on an embodiment of the present invention.

FIG. 9 is a schematic diagram of a decoding time simulation result of a decoding method based on an embodiment of the present invention. As shown in FIG. 9, in the method of the embodiments of the present invention, there is basically no multiplication operation MUL, and an addition operation ADD is added. In addition, in the method of the embodiments of the present invention, an exponential operation EXP is replaced by a maximum operation MAX. However, complexity of multiplication is far greater than that of addition (generally, multiplication is three times more complex than addition), and complexity of EXP is also far greater than the MAX operation. Therefore, according to the method in the embodiments of the present invention, an algorithm is greatly simplified, and complexity is reduced. It can also be seen from FIG. 9 that, according to the method in the embodiments of the present invention, an algorithm can be greatly simplified, and complexity is reduced, thereby lowering a requirement for hardware.

In the foregoing, the decoding method in the embodiments of the present invention is described in detail with reference to FIG. 1 to FIG. 9. The following describes in detail a decoding apparatus in the embodiments of the present invention with reference to FIG. 10 and FIG. 11.

Figure 10:
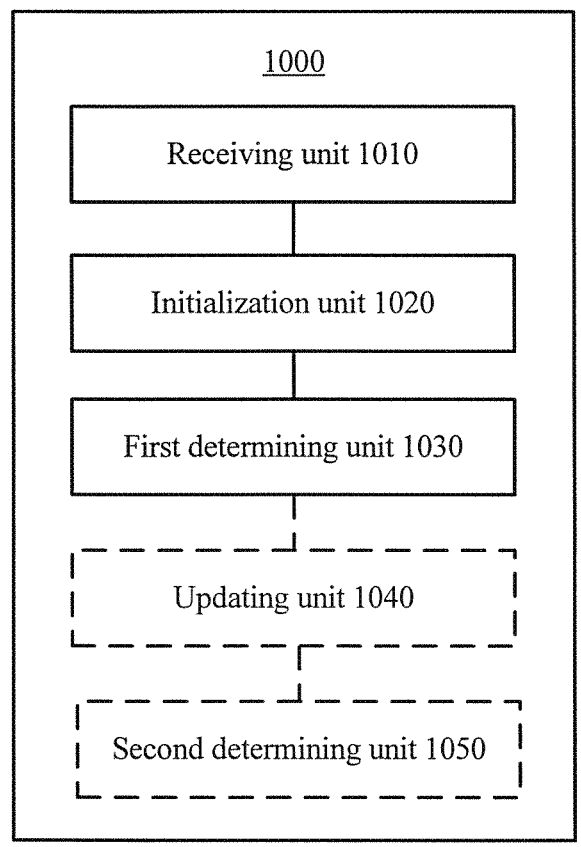
FIG. 10 is a schematic block diagram of a decoding apparatus according to an embodiment of the present invention.

FIG. 10 is a schematic block diagram of a decoding apparatus according to an embodiment of the present invention. The decoding apparatus may be a receiver, a decoder, a base station, an access end, or the like. The apparatus 1000 shown in FIG. 10 includes: a receiving unit 1010, an initialization unit 1020, and a first determining unit 1030.

Specifically, the receiving unit 1010 is configured to receive K user signals by using N subcarriers, where one user signal is carried on at least two subcarriers of the N subcarriers, one subcarrier carries at least two user signals of the K user signals, and 2≤N<K. The initialization unit 1020 is configured to determine, from the N subcarriers, at least two target subcarriers that carry a target user signal, and perform initialization calculation on the target subcarriers, to obtain initialization calculation results. The first determining unit 1030 is configured to determine, in a logarithm domain, a probability of each codeword in a codebook of the target user signal according to the initialization calculation results, to decode the target user signal.

Therefore, in this embodiment of the present invention, initialization calculation may be performed on target subcarriers that carry a target user signal, and then, a probability of each codeword in a codebook of the target user signal is determined in a logarithm domain according to initialization calculation results, thereby reducing algorithm complexity and lowering a requirement for hardware.

The decoding apparatus in FIG. 10 can implement processes of the decoding method in the embodiments of FIG. 5 to FIG. 9. To avoid repetition, details are not described herein again.

Optionally, in another embodiment, the first determining unit 1030 obtains a first probability according to the target subcarriers, where the first probability includes a probability of each codeword in a codebook of associated user signals, and the associated user signals are all user signals, except the target user signal, of user signals carried on the target subcarriers; determines, in the logarithm domain, a second probability according to the initialization calculation results and the first probability, where the second probability includes a probability that is of each codeword in the codebook of the target user signal and that is corresponding to each of the target subcarriers; and determines the probability of each codeword in the codebook of the target user signal according to the second probability.

Optionally, in another embodiment, there are two associated user signals, a serial number of a first associated user signal $q_a$ in the K user signals is a, a serial number of a second associated user signal $q_b$ in the K user signals is b, and a serial number of the target user signal $q_k$ in the K user signals is k. The first determining unit 1030 determines the second probability according to the following formula:

$$I_{c_n \to q_k}^{log}(i) = \max_{\alpha,\beta}\{f(.) + I_{q_a \to c_n}^{log}(\alpha) + I_{q_b \to c_n}^{log}(\beta)\},$$

$$i = 1, \ldots |C_k|, \alpha = 1, \ldots |C_a|, \beta = 1, \ldots |C_b|, n \in Z(k),$$

where $I_{c_n \to q_k}^{log}(i)$ represents a probability that is of the $i^{th}$ codeword in the codebook of the target user signal $q_k$ and that is obtained through calculation based on a target subcarrier $c_n$ of the at least two target subcarriers; n is a serial number of the target subcarrier $c_n$ in the N subcarriers; Z(k) represents a set of serial numbers of the target subcarriers in the N subcarriers; α represents a serial number of a codeword in a codebook of the first associated user signal; β represents a serial number of a codeword in a codebook of the second associated user signal; i represents a serial number of the codeword in the codebook of the target user signal; f(.) represents an initialization calculation result of the target subcarrier $c_n$; $I_{q_a \to c_n}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords included in the codebook of the target user signal $q_k$; $|C_a|$ represents a quantity of codewords included in the codebook of the first associated user signal $q_a$; and $|C_b|$ represents a quantity of codewords included in the codebook of the second associated user signal $q_b$.

Optionally, in another embodiment, the apparatus in this embodiment of the present invention further includes: an updating unit 1040, configured to: update, in the logarithm domain, the first probability according to the target subcarriers; and update, in the logarithm domain, the second probability according to an updated first probability. The first determining unit determines the probability of each codeword in the codebook of the target user signal according to the updated second probability.

Optionally, in another embodiment, the updating unit 1040 determines a third associated user signal from at least two associated user signals carried on a first target subcarrier of the at least two target subcarriers; determines an associated subcarrier according to the third associated user signal, where the associated subcarrier is a subcarrier, except the first target subcarrier, of the N subcarriers that carries the third associated user signal; and updates a probability of each codeword in a codebook of the third associated user signal according to the associated subcarrier and based on the following formula:

$$I_{q_a \to c_n}^{log}(\alpha) = \sum_{!n \in W(a)} I_{c_{!n} \to q_a}^{log}(\alpha), \alpha = 1, \ldots |C_a|$$

where $I_{q_a \to c_n}^{log}(\alpha)$ represents a probability that is of the $\alpha^{th}$ codeword in the codebook of the third associated user signal $q_a$ and that is corresponding to the first target subcarrier $c_n$ of the at least two target subcarriers; n represents a serial number of the first target subcarrier in the N subcarriers; a represents a serial number of the third associated user signal $q_a$ in the K user signals; α represents a serial number of a codeword in the codebook of the third associated user signal $q_a$; W(a) represents a set of a serial number of the associated subcarrier in the N subcarriers; !n represents a serial number of an associated subcarrier $c_n$ in the N subcarriers; $I_{c_{!n} \to q_q}^{log}(\alpha)$ represents a probability that is of the $\alpha^{th}$ codeword in the codebook of the third associated user signal $q_a$ and that is obtained through calculation based on the associated subcarrier $c_{!n}$; and $|C_a|$ represents a quantity of codewords included in the codebook of the first associated user signal $q_a$.

Optionally, in another embodiment, the serial number of the target user signal $q_k$ in the K user signals is k. The first determining unit 1030 determines the probability $Q_k^{log}(i)$ of each codeword in the codebook of the target user signal $q_k$ according to the following formula:

$$Q_k^{log}(i) = \sum_{n \in Z(k)} I_{c_n \to q_k}^{log}(i), i = 1, \ldots |C_k|$$

where i represents the serial number of the codeword in the codebook of the target user signal; n is a serial number of the target subcarrier $c_n$ of the at least two target subcarriers in the N subcarriers; Z(k) represents the set of the serial numbers of the target subcarriers in the N subcarriers; $I_{c_n \to q_k}^{log}(i)$ represents the probability that is of the $i^{th}$ codeword in the codebook of the target user signal $q_k$ and that is obtained, after updating, through calculation based on the target subcarrier $c_n$; and $|C_k|$ represents the quantity of codewords included in the codebook of the target user signal $q_k$.

Optionally, in another embodiment, the apparatus in this embodiment of the present invention further includes: a second determining unit 1050, configured to determine, in the logarithm domain according to the probability of each codeword in the codebook of the target user signal, a log-likelihood ratio LLR corresponding to each codeword in the codebook of the target user signal.

Optionally, in another embodiment, the serial number of the target user signal $q_k$ in the K user signals is k. The second determining unit 1050 determines, according to the following formula, an LLR of a bit value of each bit in a modulation symbol corresponding to the $i^{th}$ codeword in the codebook of the target user signal, to determine an LLR corresponding to the $i^{th}$ codeword in the codebook of the target user signal:

$$LLR_x = \max_{i:u_{i,x}=0}\left(\sum_{n \in Z(k)} I_{c_n \to q_k}^{log}(i)\right) - \max_{i:u_{i,x}=1}\left(\sum_{n \in Z(k)} I_{c_n \to q_k}^{log}(i)\right),$$

$$x = 1, \ldots, X$$

where $LLR_x$ represents an LLR of a bit value of the $x^{th}$ bit in the modulation symbol corresponding to the $i^{th}$ codeword in the codebook of the target user signal $q_k$; X represents a bit count of a bit value in the modulation symbol corresponding to the $i^{th}$ codeword in the codebook of the target user signal $q_k$; $I_{c_n \to q_k}^{log}(i)$ represents the probability that is of the $i^{th}$ codeword in the codebook of the target user signal $q_k$ and that is obtained through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; and $u_{i,x}$ represents the bit value of the $x^{th}$ bit in the modulation symbol corresponding to the $i^{th}$ codeword in the codebook of the target user signal $q_k$.

Optionally, in another embodiment, the initialization unit 1020 performs initialization calculation on the target subcarriers according to a received signal on the target subcarriers and channel estimation for the target subcarriers, where the received signal includes the target user signal and the associated user signals.

Optionally, in another embodiment, there are two associated user signals, the serial number of the first associated user signal in the K user signals is a, the serial number of the second associated user signal in the K user signals is b, and the serial number of the target user signal in the K user signals is k. The initialization unit 1020 performs initialization calculation according to the following formula, to obtain the initialization calculation result f(.):

$$f(.) = f(y_n, \alpha, \beta, i, H_n)$$
$$= \|y_{n,r1} - (h_{n,a,r1}C_a(\alpha) + h_{n,b,r1}C_b(\beta) + h_{n,k,r1}C_k(i))\| -$$
$$\|y_{n,r2} - (h_{n,a,r2}C_a(\alpha) + h_{n,b,r2}C_b(\beta) + h_{n,k,r2}C_k(i))\|$$

where n represents the serial number of the first target subcarrier of the at least two target subcarriers in the N subcarriers; $y_n$ represents a received signal on the first target subcarrier; α represents the serial number of the codeword in the codebook of the first associated user signal; β represents the serial number of the codeword in the codebook of the second associated user signal; i represents the serial number of the codeword in the codebook of the target user signal; f(.) represents the initialization calculation result of the first target subcarrier $c_n$; $H_n$ represents a channel estimation matrix for the first target subcarrier $c_a$; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the $r1^{th}$ receive antenna and provided to the first associated user signal; $h_{n,k,r2}$ represents uplink channels that are corresponding to the first target subcarrier and the $r2^{th}$ receive antenna and provided to the first associated user signal; $h_{n,b,r1}$ represents uplink channels that are corresponding to the first target subcarrier and the $r1^{th}$ receive antenna and provided to the second associated user signal; $h_{n,b,r2}$ represents uplink channels that are corresponding to the first target subcarrier and the $r2^{th}$ receive antenna and provided to the second associated user signal; $h_{n,k,r1}$ represents uplink channels that are corresponding to the first target subcarrier and the $r1^{th}$ receive antenna and provided to the target user signal; $h_{n,k,r2}$ represents uplink channels that are corresponding to the first target subcarrier and the $r2^{th}$ receive antenna and provided to the target signal; $C_a(\alpha)$ represents the $\alpha^{th}$ codeword in the codebook of the first associated user signal; $C_b(\beta)$ represents the $\beta^{th}$ codeword in the codebook of the second associated user signal; and $C_k(i)$ represents the $i^{th}$ codeword in the codebook of the target user signal.

Optionally, in another embodiment, the first determining unit 1030 determines the probability of each codeword in the codebook of the target user signal based on a Jacobi's logarithm formula and according to the initialization calculation results.

Figure 11:
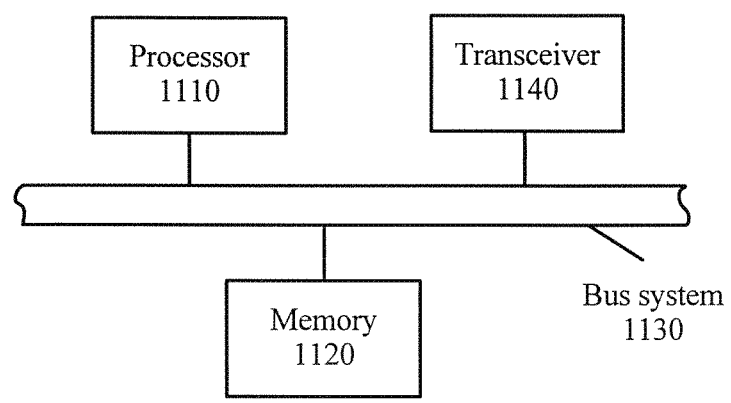
FIG. 11 is a schematic block diagram of a decoding apparatus according to another embodiment of the present invention.

FIG. 11 is a schematic block diagram of a decoding apparatus according to another embodiment of the present invention. The apparatus 1100 in FIG. 11 includes a processor 1110, a memory 1120, a bus system 1130, and a transceiver 1140. The processor 1110, the memory 1120, and the transceiver 1140 are connected to each other by using the bus system 1130.

Specifically, the transceiver 1140 is configured to receive K user signals by using N subcarriers, where one user signal is carried on at least two subcarriers of the N subcarriers, one subcarrier carries at least two user signals of the K user signals, and 2≤N<K. The processor 1110 is configured to: invoke, by using the bus system 1130, code stored in the memory 1120, determine, from the N subcarriers, at least two target subcarriers that carry a target user signal, and perform initialization calculation on the target subcarriers, to obtain initialization calculation results; and determine, in a logarithm domain, a probability of each codeword in a codebook of the target user signal according to the initialization calculation results, to decode the target user signal.

Therefore, therefore, in this embodiment of the present invention, initialization calculation may be performed on target subcarriers that carry a target user signal; and then, a probability of each codeword in a codebook of the target user signal is determined in a logarithm domain according to initialization calculation results, thereby reducing algorithm complexity and lowering a requirement for hardware.

The method disclosed in the foregoing embodiments of the present invention may be applied to the processor 1110, or be implemented by the processor 1110. The processor 1110 may an integrated circuit chip, and has a signal processing capability. In an implementation process, the steps of the foregoing method may be completed by using a hardware integrated logic circuit in the processor 1110 or an instruction in a form of software. The foregoing processor 1110 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or a transistor logic device, a discrete hardware component, or the like. The processor 1110 may implement or perform methods, steps, and logical block diagrams disclosed in the embodiments of the present invention. The general-purpose processor may be a microprocessor, or the processor may be any conventional processor. The steps of the method disclosed with reference to the embodiments of the present invention may be directly performed and completed by a hardware decoding processor, or performed and completed by a combination of hardware and software modules in a decoding processor. The software module may be located in a mature storage medium in the art, such as a random access memory (Random Access Memory, RAM), a flash memory, a read-only memory (Read-Only Memory, ROM), a programmable read-only memory or an electrically erasable programmable memory, or a register. The storage medium is located in the memory 1120. The processor 1110 reads information from the memory 1120, and completes the steps of the foregoing method in combination with hardware of the processor 1110. In addition to a data bus, the bus system 1130 may further include a power bus, a control bus, a status signal bus, and the like. However, for clarity of description, various buses are all marked as the bus system 1130 in the figure.

The decoding apparatus in FIG. 11 can implement processes of the decoding method in the embodiments of FIG. 5 to FIG. 9. To avoid repetition, details are not described herein again.

Optionally, in another embodiment, the processor 1110 obtains a first probability according to the target subcarriers, where the first probability includes a probability of each codeword in a codebook of associated user signals, and the associated user signals are all user signals, except the target user signal, of user signals carried on the target subcarriers; determines, in the logarithm domain, a second probability according to the initialization calculation results and the first probability, where the second probability includes a probability that is of each codeword in the codebook of the target user signal and that is corresponding to each of the target subcarriers; and determines the probability of each codeword in the codebook of the target user signal according to the second probability.

Optionally, in another embodiment, there are two associated user signals, a serial number of a first associated user signal $q_a$ in the K user signals is a, a serial number of a second associated user signal $q_b$ in the K user signals is b, and a serial number of the target user signal $q_k$ in the K user signals is k.

The processor 1110 determines the second probability according to the following formula:

$$I_{c_n \to q_k}^{log}(i) = \max_{\alpha,\beta}\{f(\cdot) + I_{q_a \to c_n}^{log}(\alpha) + I_{q_b \to c_n}^{log}(\beta)\}, i = 1,$$

$$\ldots |C_k|, \alpha = 1, \ldots |C_a|, \beta = 1, \ldots |C_b|, n \in Z(k),$$

where $I_{c_n \to q_k}^{log}(i)$ represents a probability that is of the $i^{th}$ codeword in the codebook of the target user signal $q_k$ and that is obtained through calculation based on a target subcarrier $c_n$ of the at least two target subcarriers; n is a serial number of the target subcarrier $c_n$ in the N subcarriers; Z(k) represents a set of serial numbers of the target subcarriers in the N subcarriers; α represents a serial number of a codeword in a codebook of the first associated user signal; β represents a serial number of a codeword in a codebook of the second associated user signal; i represents a serial number of the codeword in the codebook of the target user signal; f(.) represents an initialization calculation result of the target subcarrier $c_n$; $I_{q_a \to c_n}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords included in the codebook of the target user signal $q_k$; $|C_a|$ represents a quantity of codewords included in the codebook of the first associated user signal $q_a$; and $|C_b|$ represents a quantity of codewords included in the codebook of the second associated user signal $q_b$.

Optionally, in another embodiment, the processor 1110 is further configured to: update, in the logarithm domain, the first probability according to the target subcarriers; update, in the logarithm domain, the second probability according to an updated first probability; and determine the probability of each codeword in the codebook of the target user signal according to an updated second probability.

Optionally, in another embodiment, the processor 1110 determines a third associated user signal from at least two associated user signals carried on a first target subcarrier of the at least two target subcarriers; determines an associated subcarrier according to the third associated user signal, where the associated subcarrier is a subcarrier, except the first target subcarrier, of the N subcarriers that carries the third associated user signal; and updates a probability of each codeword in a codebook of the third associated user signal according to the associated subcarrier and based on the following formula:

$$I_{q_a \to c_n}^{log}(\alpha) = \sum_{!n \in W(a)} I_{c_{1n} \to q_n}^{log}(\alpha), \alpha = 1, \ldots |C_a|$$

where $I_{q_a \to c_n}^{log}(\alpha)$ represents a probability that is of the $\alpha^{th}$ codeword in the codebook of the third associated user signal $q_a$ and that is corresponding to the first target subcarrier $c_n$ of the at least two target subcarriers; n represents a serial number of the first target subcarrier in the N subcarriers; a represents a serial number of the third associated user signal $q_a$ in the K user signals; α represents a serial number of a codeword in the codebook of the third associated user signal $q_a$; W(a) represents a set of a serial number of the associated subcarrier in the N subcarriers; !n represents a serial number of an associated subcarrier $c_{!n}$ in the N subcarriers; $I_{c_{!n} \to q_n}^{log}(\alpha)$ represents a probability that is of the $\alpha^{th}$ codeword in the codebook of the third associated user signal $q_a$ and that is obtained through calculation based on the associated subcarrier $c_n$; and $|C_a|$ represents a quantity of codewords included in the codebook of the first associated user signal $q_a$.

Optionally, in another embodiment, the serial number of the target user signal $q_k$ in the K user signals is k. The processor 1110 is configured to determine the probability $Q_k^{log}(i)$ of each codeword in the codebook of the target user signal $q_k$ according to the following formula:

$$Q_k^{log}(i) = \sum_{n \in Z(k)} I_{c_n \to q_k}^{log}(i), i = 1, \ldots |C_k|$$

where i represents the serial number of the codeword in the codebook of the target user signal; n is a serial number of the target subcarrier $c_n$ of the at least two target subcarriers in the N subcarriers; Z(k) represents the set of the serial numbers of the target subcarriers in the N subcarriers; $I_{c_n \to q_k}^{log}(i)$ represents the probability that is of the $i^{th}$ codeword in the codebook of the target user signal $q_k$ and that is obtained, after updating, through calculation based on the target subcarrier $c_n$; and $|C_k|$ represents the quantity of codewords included in the codebook of the target user signal $q_k$.

Optionally, in another embodiment, the processor 1110 is further configured to determine, in the logarithm domain according to the probability of each codeword in the codebook of the target user signal, a log-likelihood ratio LLR corresponding to each codeword in the codebook of the target user signal.

Optionally, in another embodiment, the serial number of the target user signal $q_k$ in the K user signals is k.

The processor 1110 determines, according to the following formula, an LLR of a bit value of each bit in a modulation symbol corresponding to the $i^{th}$ codeword in the codebook of the target user signal, to determine an LLR corresponding to the $i^{th}$ codeword in the codebook of the target user signal:

$$LLR_x = \max_{i:u_{i,x}=0}\left(\sum_{n \in Z(k)} I_{c_n \to q_k}^{log}(i)\right) - \max_{i:u_{i,x}=1}\left(\sum_{n \in Z(k)} I_{c_n \to q_k}^{log}(i)\right), x = 1, \ldots, X$$

where $LLR_x$ represents an LLR of a bit value of the $x^{th}$ bit in the modulation symbol corresponding to the $i^{th}$ codeword in the codebook of the target user signal $q_k$; X represents a bit count of a bit value in the modulation symbol corresponding to the $i^{th}$ codeword in the codebook of the target user signal $q_k$; $I_{c_n \to q_k}^{log}(i)$ represents the probability that is of the $i^{th}$ codeword in the codebook of the target user signal $q_k$ and that is obtained through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; and $u_{i,x}$ represents the bit value of the $x^{th}$ bit in the modulation symbol corresponding to the $i^{th}$ codeword in the codebook of the target user signal $q_k$.

Optionally, in another embodiment, the processor 1110 performs initialization calculation on the target subcarriers according to a received signal on the target subcarriers and channel estimation for the target subcarriers, where the received signal includes the target user signal and the associated user signals.

Optionally, in another embodiment, there are two associated user signals, the serial number of the first associated user signal in the K user signals is a, the serial number of the second associated user signal in the K user signals is b, and the serial number of the target user signal in the K user signals is k.

The processor 1110 performs initialization calculation according to the following formula, to obtain the initialization calculation result f(.):

$$f(\cdot) = f(y_n, \alpha, \beta, i, H_n)$$
$$= \|y_{n,r1} - (h_{n,a,r1}C_a(\alpha) + h_{n,b,r1}C_b(\beta) + h_{n,k,r1}C_k(i))\| -$$
$$\|y_{n,r2} - (h_{n,a,r2}C_a(\alpha) + h_{n,b,r2}C_b(\beta) + h_{n,k,r2}C_k(i))\|$$

where n represents the serial number of the first target subcarrier of the at least two target subcarriers in the N subcarriers; $y_n$ represents a received signal on the first target subcarrier; α represents the serial number of the codeword in the codebook of the first associated user signal; β represents the serial number of the codeword in the codebook of the second associated user signal; i represents the serial number of the codeword in the codebook of the target user signal; f(.) represents the initialization calculation result of the first target subcarrier $c_n$; $H_n$ represents a channel estimation matrix for the first target subcarrier $c_n$; $y_{n,r1}$ represents a received signal that is received on the first target subcarrier by using the $r_{1th}$ receive antenna; $y_{n,r2}$ represents a received signal that is received on the first target subcarrier by using the $r_{2th}$ receive antenna; $h_{n,a,r1}$ represents uplink channels that are corresponding to the first target subcarrier and the r1$^{th}$ receive antenna and provided to the first associated user signal; $h_{n,a,r2}$ represents up link channels that are corresponding to the first target subcarrier and the r2$^{th}$ receive antenna and provided to the first associated user signal; $h_{n,b,r1}$ represents uplink channels that are corresponding to the first target subcarrier and the r1$^{th}$ receive antenna and provided to the second associated user signal; $h_{n,b,r2}$ represents uplink channels that are corresponding to the first target subcarrier and the r2$^{th}$ receive antenna and provided to the second associated user signal; $h_{n,k,r1}$ represents uplink channels that are corresponding to the first target subcarrier and the r1$^{th}$ receive antenna and provided to the target user signal; $h_{n,k,r2}$ represents uplink channels that are corresponding to the first target subcarrier and the r2$^{th}$ receive antenna and provided to the target signal; $C_a(\alpha)$ represents the α$^{th}$ codeword in the codebook of the first associated user signal; $C_b(\beta)$ represents the β$^{th}$ codeword in the codebook of the second associated user signal; and $C_k(i)$ represents the i$^{th}$ codeword in the codebook of the target user signal.

Optionally, in another embodiment, the processor 1110 determines the probability of each codeword in the codebook of the target user signal based on a Jacobi's logarithm formula and according to the initialization calculation results.

"One embodiment" or "an embodiment" mentioned in the entire specification means that specific characteristics, structures, or features related to an embodiment is included in at least one embodiment of the present invention. Therefore, "in one embodiment" or "in an embodiment" appeared at different locations in the entire specification does not necessarily refer to a same embodiment. In addition, these specific characteristics, structures, or features may be combined in one or more embodiments in any proper manner.

It should be understood that the term "and/or" in this specification describes only an association relationship for describing associated objects and indicates that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, but should not constitute any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A decoding method, the method comprising:
   receiving K user signals by using N subcarriers, wherein one user signal is carried on at least two subcarriers of the N subcarriers, one subcarrier carries at least two user signals of the K user signals, and $2 \le N < K$;
   determining, from the N subcarriers, at least two target subcarriers that carry a target user signal, and performing an initialization calculation on the target subcarriers, to obtain initialization calculation results; and
   determining, in a logarithm domain, a probability of each codeword in a codebook of the target user signal according to the initialization calculation results, to decode the target user signal;
   wherein determining, in the logarithm domain, the probability of each codeword in the codebook of the target user signal according to the initialization calculation results comprises:
   obtaining a first probability according to the target subcarriers, wherein the first probability comprises a probability of each codeword in a codebook of associated user signals, and the associated user signals are all user signals, except the target user signal, of user signals carried on the target subcarriers;
   determining, in the logarithm domain, a second probability according to the initialization calculation results and the first probability, wherein the second probability comprises a probability that is of each codeword in the codebook of the target user signal and that is corresponding to each of the target subcarriers; and
   determining the probability of each codeword in the codebook of the target user signal according to the second probability.

2. The method according to claim 1, wherein there are two associated user signals, a serial number of a first associated user signal $q_a$ in the K user signals is a, a serial number of a second associated user signal $q_b$ in the K user signals is b, and a serial number of the target user signal $q_k$ in the K user signals is k; and determining, in the logarithm domain, the second probability according to the initialization calculation results and the first probability comprises:
determining the second probability according to the following formula:

$$I_{c_n \to q_k}^{log}(i) = \max_{\alpha,\beta}\{f(\cdot) + I_{q_a \to c_n}^{log}(\alpha) + I_{q_b \to c_n}^{log}(\beta)\}, i = 1,$$
$$\ldots |C_k|, \alpha = 1, \ldots |C_a|, \beta = 1, \ldots |C_b|, n \in Z(k),$$

wherein $I_{c_n \to q_k}^{log}(i)$ represents a probability that is of the $i^{th}$ codeword in the codebook of the target user signal $q_k$ and that is obtained through calculation based on a target subcarrier $c_n$ of the at least two target subcarriers; n is a serial number of the target subcarrier $c_n$ in the N subcarriers; Z(k) represents a set of serial numbers of the target subcarriers in the N subcarriers; α represents a serial number of a codeword in a codebook of the first associated user signal; β represents a serial number of a codeword in a codebook of the second associated user signal; i represents a serial number of the codeword in the codebook of the target user signal; f(.) represents an initialization calculation result for the target subcarrier $c_n$; $I_{q_a \to c_n}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords comprised in the codebook of the target user signal $q_k$; $|C_a|$ represents a quantity of codewords comprised in the codebook of the first associated user signal $q_a$; and $|C_b|$ represents a quantity of codewords comprised in the codebook of the second associated user signal $q_b$.

3. The method according to claim 1, herein after determining the second probability, the method further comprises:
   updating, in the logarithm domain, the first probability according to the target subcarriers; and
   updating, in the logarithm domain, the second probability according to an updated first probability, wherein
   determining the probability of each codeword in the codebook of the target user signal according to the second probability comprises:
   determining the probability of each codeword in the codebook of the target user signal according to the updated second probability.

4. The method according to claim 3, wherein updating, in the logarithm domain, the first probability according to the target subcarriers comprises:
   determining a third associated user signal from at least two of the associated user signals carried on a first target subcarrier of the at least two target subcarriers;
   determining an associated subcarrier according to the third associated user signal, wherein the associated subcarrier is a subcarrier, except the first target subcarrier, of the N subcarriers that carries the third associated user signal; and
   updating a probability of each codeword in a codebook of the third associated user signal according to the associated subcarrier and based on the following formula:

$$I_{q_a \to c_n}^{log}(\alpha) = \sum_{!n \in W(a)} I_{c_{!n} \to q_a}^{log}(\alpha), \alpha = 1, \ldots |C_a|$$

wherein $I_{q_a \to c_n}^{log}(\alpha)$ represents a probability that is of the $\alpha^{th}$ codeword in the codebook of the third associated user signal $q_a$ and that is corresponding to the first target subcarrier $c_n$ of the at least two target subcarriers; n represents a serial number of the first target subcarrier in the N subcarriers; a represents a serial number of the third associated user signal $q_a$ in the K user signals; $\alpha$ represents a serial number of a codeword in the codebook of the third associated user signal $q_a$; W(a) represents a set of a serial number of the associated subcarrier in the N subcarriers; !n represents a serial number of the associated subcarrier $c_{!n}$ in the N subcarriers; $I_{c_{!n} \to q_a}^{log}(\alpha)$ represents a probability that is of the $\alpha^{th}$ codeword in the codebook of the third associated user signal $q_a$ and that is obtained through calculation based on the associated subcarrier $c_{!n}$; and $|C_a|$ represents a quantity of codewords comprised in the codebook of the third associated user signal $q_a$.

5. The method according to claim 3, wherein the serial number of the target user signal $q_k$ in the K user signals is k; and
determining the probability of each codeword in the codebook of the target user signal according to the updated second probability comprises:
determining the probability $Q_k^{log}(i)$ of each codeword in the codebook of the target user signal $q_k$ according to the following formula:

$$Q_k^{log}(i) = \sum_{n \in Z(k)} I_{c_n \to q_k}^{log}(i), \, i = 1, \ldots |C_k|$$

wherein i represents the serial number of the codeword in the codebook of the target user signal; n is a serial number of the target subcarrier $c_n$ of the at least two target subcarriers in the N subcarriers; Z(k) represents the set of the serial numbers of the target subcarriers in the N subcarriers; $I_{c_n \to q_k}^{log}(i)$ represents the probability that is of the $i^{th}$ codeword in the codebook of the target user signal $q_k$ and that is obtained, after updating, through calculation based on the target subcarrier $c_n$; and $|C_k|$ represents the quantity of codewords comprised in the codebook of the target user signal $q_k$.

6. The method according to claim 1, further comprising:
determining, in the logarithm domain according to the probability of each codeword in the codebook of the target user signal, a log-likelihood ratio (LLR) corresponding to each codeword in the codebook of the target user signal.

7. The method according to claim 6, wherein the serial number of the target user signal $q_k$ in the K user signals is k; and
determining the log-likelihood ratio (LLR) corresponding to each codeword in the codebook of the target user signal comprises:
determining, according to the following formula, an LLR of a bit value of each bit in a modulation symbol corresponding to the $i^{th}$ codeword in the codebook of the target user signal, to determine an LLR corresponding to the $i^{th}$ codeword in the codebook of the target user signal:

$$LLR_x = \max_{i:u_{i,x}=0}\left(\sum_{n \in Z(k)} I_{c_n \to q_k}^{log}(i)\right) - \max_{i:u_{i,x}=1}\left(\sum_{n \in Z(k)} I_{c_n \to q_k}^{log}(i)\right), \, x = 1, \ldots, X$$

wherein $LLR_x$ represents an LLR of a bit value of the $x^{th}$ bit in the modulation symbol corresponding to the $i^{th}$ codeword in the codebook of the target user signal $q_k$; X represents a bit count of a bit value in the modulation symbol corresponding to the $i^{th}$ codeword in the codebook of the target user signal $q_k$; $I_{c_n \to q_k}^{log}(i)$ represents the probability that is of the i t codeword in the codebook of the target user signal $q_k$ and that is obtained through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; and $u_{i,x}$ represents the bit value of the $x^{th}$ bit in the modulation symbol corresponding to the $i^{th}$ codeword in the codebook of the target user signal $q_k$.

8. The method according to claim 1, wherein determining, from the N subcarriers, the at least two target subcarriers that carry the target user signal, and performing initialization calculation on the target subcarriers, to obtain the initialization calculation results comprises:
performing the initialization calculation on the target subcarriers according to a received signal on the target subcarriers and channel estimation for the target subcarriers, wherein the received signal comprises the target user signal and associated user signals.

9. The method according to claim 8, wherein there are two associated user signals, the serial number of a first associated user signal in the K user signals is a, the serial number of a second associated user signal in the K user signals is b, and the serial number of the target user signal in the K user signals is k; and
performing the initialization calculation on the target subcarriers according to the received signal on the target subcarriers and the channel estimation for the target subcarriers, to obtain the initialization calculation results comprises:
performing the initialization calculation according to the following formula, to obtain the initialization calculation result f(.):

$$f(\cdot) = f(y_n, \alpha, \beta, i, H_n)$$
$$= \|y_{n,r1} - (h_{n,a,r1}C_a(\alpha) + h_{n,b,r1}C_b(\beta) + h_{n,k,r1}C_k(i))\| -$$
$$\|y_{n,r2} - (h_{n,a,r2}C_a(\alpha) + h_{n,b,r2}C_b(\beta) + h_{n,k,r2}C_k(i))\|$$

wherein n represents the serial number of the first target subcarrier of the at least two target subcarriers in the N subcarriers; $y_n$ represents a received signal on a first target subcarrier; $\alpha$ represents the serial number of the codeword in the codebook of the first associated user signal; $\beta$ represents the serial number of the codeword in the codebook of the second associated user signal; i represents the serial number of the codeword in the codebook of the target user signal; f(.) represents the initialization calculation result of the first target subcarrier $c_n$; $H_n$ represents a channel estimation matrix for the first target subcarrier $c_n$; $y_{n,r1}$ represents a received signal that is received on the first target subcarrier by using the r1-th receive antenna; $y_{n,r2}$ represents a received signal that is received on the first target subcarrier by using the r2-th receive antenna; $h_{n,a,r1}$ represents uplink channels that are corresponding to the first target subcarrier and the r1-th receive antenna and provided to the first associated user signal; $h_{n,a,r2}$ represents uplink channels that are corresponding to the first target subcarrier and the r2-th receive antenna and provided to the first associated user signal; $h_{n,b,r1}$ represents uplink channels that are corresponding to the first target subcarrier and the r1-th receive antenna and provided to the second associated user signal; $h_{n,b,r2}$ represents uplink channels that are corresponding to the first target subcarrier and the r2-th receive antenna and provided to the second associated user signal; $h_{n,k,r1}$ represents uplink channels that are corresponding to the first target subcarrier and the r1-th receive antenna and provided to the target user signal; $h_{n,k,r2}$ represents uplink channels that are corresponding to the first target subcarrier and the r2-th receive antenna and provided to the target user signal; $C_a(\alpha)$ represents the $\alpha^{th}$ codeword in the codebook of the first associated user signal; $C_b(\beta)$ represents the $\beta^{th}$ codeword in the codebook of the second associated user signal; and $C_k(i)$ represents the $i^{th}$ codeword in the codebook of the target user signal.

10. The method according to claim 1, wherein determining, in the logarithm domain, the probability of each codeword in the codebook of the target user signal according to the initialization calculation results comprises:
   determining the probability of each codeword in the codebook of the target user signal based on a Jacobi's logarithm formula and according to the initialization calculation results.

11. A decoding apparatus, comprising:
   a transceiver, configured to receive K user signals by using N subcarriers, wherein one user signal is carried on at least two subcarriers of the N subcarriers, one subcarrier carries at least two user signals of the K user signals, and 2≤N<K;
   a processor;
   memory coupled to the processor, the memory comprising instructions that, when executed by the processor, cause the apparatus to:
      determine, from the N subcarriers, at least two target subcarriers that carry a target user signal, and perform an initialization calculation on the target subcarriers, to obtain initialization calculation results, and
      determine, in a logarithm domain, a probability of each codeword in a codebook of the target user signal according to the initialization calculation results, to decode the target user signal; and
   wherein the determining in the logarithm domain, the probability of each codeword in the codebook of the target user signal according to the initialization calculation results, comprises:
      obtaining a first probability according to the target subcarriers, wherein the first probability comprises a probability of each codeword in a codebook of associated user signals, and the associated user signals are all user signals, except the target user signal, of user signals carried on the target subcarriers; and
      determining, in the logarithm domain, a second probability according to the initialization calculation results and the first probability, wherein the second probability comprises a probability that is of each codeword in the codebook of the target user signal and that is corresponding to each of the target subcarriers; and determining the probability of each codeword in the codebook of the target user signal according to the second probability.

12. The apparatus according to claim 11, wherein there are two associated user signals, and a serial number of a first associated user signal $q_a$ in the K user signals is a, a serial number of a second associated user signal $q_b$ in the K user signals is b, and a serial number of the target user signal $q_k$ in the K user signals is k; and
   the apparatus determines the second probability according to the following formula:

$$I_{c_n \to q_k}^{log}(i) = \max_{\alpha,\beta}\{f(\cdot) + I_{q_a \to c_n}^{log}(\alpha) + I_{q_b \to c_n}^{log}(\beta)\}, i = 1,$$
$$\ldots |C_k|, \alpha = 1, \ldots |C_a|, \beta = 1, \ldots |C_b|, n \in Z(k),$$

wherein $I_{c_n \to q_k}^{log}(i)$ represents a probability that is of the $i^{th}$ codeword in the codebook of the target user signal $q_k$ and that is obtained through calculation based on a target subcarrier $c_n$ of the at least two target subcarriers; n is a serial number of the target subcarrier $c_n$ in the N subcarriers; Z(k) represents a set of serial numbers of the target subcarriers in the N subcarriers; $\alpha$ represents a serial number of a codeword in a codebook of the first associated user signal; $\beta$ represents a serial number of a codeword in a codebook of the second associated user signal; i represents a serial number of the codeword in the codebook of the target user signal; f(.) represents an initialization calculation result of the target subcarrier $c_n$; $I_{q_a \to c_n}^{log}(\alpha)$ represents a probability that is of the $\alpha^{th}$ codeword in the codebook of the first associated user signal $q_a$ and that is corresponding to the target subcarrier $c_n$; $I_{q_b \to c_n}^{log}(\beta)$ represents a probability that is of the $\beta^{th}$ codeword in the codebook of the second associated user signal $q_b$ and that is corresponding to the target subcarrier $c_n$; $|C_k|$ represents a quantity of codewords comprised in the codebook of the target user signal $q_k$; $|C_a|$ represents a quantity of codewords comprised in the codebook of the first associated user signal $q_a$; and $|C_b|$ represents a quantity of codewords comprised in the codebook of the second associated user signal $q_b$.

13. The apparatus according to claim 11, wherein the instructions, when executed by the processor, cause the apparatus to:
   update, in the logarithm domain, the first probability according to the target subcarriers; and update, in the logarithm domain, the second probability according to an updated first probability, and
   determine the probability of each codeword in the codebook of the target user signal according to the updated second probability.

14. The apparatus according to claim 13, wherein the instructions, when executed by the processor, cause the apparatus to:
   determine a third associated user signal from at least two of the associated user signals carried on a first target subcarrier of the at least two target subcarriers;
   determine an associated subcarrier according to the third associated user signal, wherein the associated subcarrier is a subcarrier, except the first target subcarrier, of the N subcarriers that carries the third associated user signal; and
   update a probability of each codeword in a codebook of the third associated user signal according to the associated subcarrier and based on the following formula:

$$I_{q_a \to c_n}^{log}(\alpha) = \sum_{!n \in W(a)} I_{c_{!n} \to q_n}^{log}(\alpha), \alpha = 1, \ldots |C_a|$$

wherein $I_{q_a \to c_n}^{log}(\alpha)$ represents a probability that is of the $\alpha^{th}$ codeword in the codebook of the third associated user signal $q_a$ and that is corresponding to the first target subcarrier $c_n$ of the at least two target subcarriers; n represents a serial number of the first target subcarrier in the N subcarriers; a represents a serial number of the third associated user signal $q_a$ in the K user signals; $\alpha$ represents a serial number of a codeword in the codebook of the third associated user signal $q_a$; W(a) represents a set of a serial number of the associated subcarrier in the N subcarriers; !n represents a serial number of the associated subcarrier $c_{!n}$ in the N subcarriers; $I_{c_{!n} \to q_a}^{log}(\alpha)$ represents a probability that is of the $\alpha^{th}$ codeword in the codebook of the third associated user signal $q_a$ and that is obtained through calculation based on the associated subcarrier $c_{!n}$; and $|C_a|$ represents a quantity of codewords comprised in the codebook of the first associated user signal $q_a$.

15. The apparatus according to claim 13, wherein the serial number of the target user signal $q_k$ in the K user signals is k; and
the apparatus determines the probability $Q_k^{log}(i)$ of each codeword in the codebook of the target user signal $q_k$ according to the following formula:

$$Q_k^{log}(i) = \sum_{n \in Z(k)} I_{c_n \to q_k}^{log}(i), i = 1, \ldots |C_k|$$

wherein i represents the serial number of the codeword in the codebook of the target user signal; n is a serial number of the target subcarrier $c_n$ of the at least two target subcarriers in the N subcarriers; Z(k) represents the set of the serial numbers of the target subcarriers in the N subcarriers; $I_{c_n \to q_k}^{log}(i)$ represents the probability that is of the $i^{th}$ codeword in the codebook of the target user signal $q_k$ and that is obtained, after updating, through calculation based on the target subcarrier $c_n$; and $|C_k|$ represents the quantity of codewords comprised in the codebook of the target user signal $q_k$.

16. The apparatus according to claim 11,
wherein the instructions, when executed by the processor, cause the apparatus to determine, in the logarithm domain according to the probability of each codeword in the codebook of the target user signal, a log-likelihood ratio (LLR) corresponding to each codeword in the codebook of the target user signal.

17. The apparatus according to claim 16, wherein the serial number of the target user signal $q_k$ in the K user signals is k; and
the apparatus determines, according to the following formula, an LLR of a bit value of each bit in a modulation symbol corresponding to the $i^{th}$ codeword in the codebook of the target user signal, to determine an LLR corresponding to the $i^{th}$ codeword in the codebook of the target user signal:

$$LLR_x = \max_{i:u_{i,x}=0} \left( \sum_{n \in Z(k)} I_{c_n \to q_k}^{log}(i) \right) - \max_{i:u_{i,x}=1} \left( \sum_{n \in Z(k)} I_{c_n \to q_k}^{log}(i) \right), x = 1, \ldots, X$$

wherein $LLR_x$ represents an LLR of a bit value of the $x^{th}$ bit in the modulation symbol corresponding to the $i^{th}$ codeword in the codebook of the target user signal $q_k$; X represents a bit count of a bit value in the modulation symbol corresponding to the $i^{th}$ codeword in the codebook of the target user signal $q_k$, $I_{c_n \to q_k}^{log}(i)$ represents the probability that is of the $i^{th}$ codeword in the codebook of the target user signal $q_k$ and that is obtained through calculation based on the target subcarrier $c_n$ of the at least two target subcarriers; n represents the serial number of the target subcarrier $c_n$ in the N subcarriers; Z(k) represents the set of the serial numbers of the target subcarriers in the N subcarriers; i represents the serial number of the codeword in the codebook of the target user signal; and $u_{i,x}$ represents the bit value of the $x^{th}$ bit in the modulation symbol corresponding to the $i^{th}$ codeword in the codebook of the target user signal $q_k$.

18. The apparatus according to claim 11, wherein the instructions, when executed by the processor, cause the apparatus to perform the initialization calculation on the target subcarriers according to a received signal on the target subcarriers and channel estimation for the target subcarriers, wherein the received signal comprises the target user signal and associated user signals.

19. The apparatus according to claim 18, wherein:
there are two associated user signals, the serial number of a first associated user signal in the K user signals is a, the serial number of a second associated user signal in the K user signals is b, and the serial number of the target user signal in the K user signals is k; and
the instructions, when executed by the processor, cause the apparatus to perform the initialization calculation according to the following formula, to obtain the initialization calculation result f(.):

$$f(\cdot) = f(y_n, \alpha, \beta, i, H_n)$$
$$= \|y_{n,r1} - (h_{n,a,r1}C_a(\alpha) + h_{n,b,r1}C_b(\beta) + h_{n,k,r1}C_k(i))\| -$$
$$\|y_{n,r2} - (h_{n,a,r2}C_a(\alpha) + h_{n,b,r2}C_b(\beta) + h_{n,k,r2}C_k(i))\|$$

wherein n represents the serial number of the first target subcarrier of the at least two target subcarriers in the N subcarriers; $y_n$ represents a received signal on a first target subcarrier; $\alpha$ represents the serial number of the codeword in the codebook of the first associated user signal; $\beta$ represents the serial number of the codeword in the codebook of the second associated user signal; i represents the serial number of the codeword in the codebook of the target user signal; f(.) represents the initialization calculation result of the first target subcarrier $c_n$; $H_n$ represents a channel estimation matrix for the first target subcarrier $c_n$; $y_{n,r1}$ represents a received signal that is received on the first target subcarrier by using the r1-th receive antenna; $y_{n,r2}$ represents a received signal that is received on the first target subcarrier by using the r2-th receive antenna; $h_{n,a,r1}$ represents uplink channels that are corresponding to the first target subcarrier and the r1-th receive antenna and provided to the first associated user signal; $h_{n,a,r2}$ represents uplink channels that are corresponding to the first target subcarrier and the r2-th receive antenna and provided to the first associated user signal; $h_{n,b,r1}$ represents uplink channels that are corresponding to the first target subcarrier and the r1-th receive antenna and provided to the second associated user signal; $h_{n,b,r2}$ represents uplink channels that are corresponding to the first target subcarrier and the r2-th receive antenna and provided to the second associated user signal; $h_{n,k,r1}$ represents uplink channels that are corresponding to the first target subcarrier and the r1-th receive antenna and provided to the target user signal; $h_{n,k,r2}$ represents uplink channels that are corresponding to the first target subcarrier and the r2-th receive antenna and provided to the target signal; $C_a(\alpha)$ represents the $\alpha^{th}$ codeword in the codebook of the first associated user signal; $C_b(\beta)$ represents the $\beta^{th}$ codeword in the codebook of the second associated user signal; and $C_k(i)$ represents the $i^{th}$ codeword in the codebook of the target user signal.

20. The apparatus according to claim 11, wherein the instructions, when executed by the processor, cause the apparatus to determine the probability of each codeword in the codebook of the target user signal based on a Jacobi's logarithm formula and according to the initialization calculation results.

* * * * *